(12) United States Patent
Suzuki et al.

(10) Patent No.: US 8,330,426 B2
(45) Date of Patent: Dec. 11, 2012

(54) CHARGING SYSTEM FOR ELECTRIC POWER TOOL, BATTERY PACK FOR ELECTRIC POWER TOOL, AND BATTERY CHARGER FOR ELECTRIC POWER TOOL

(75) Inventors: Hitoshi Suzuki, Anjo (JP); Tadahiko Kobayakawa, Anjo (JP); Tomoo Muramatsu, Anjo (JP)

(73) Assignee: Makita Corporation, Aichi (JP)

( * ) Notice: Subject to any disclaimer, the term of this patent is extended or adjusted under 35 U.S.C. 154(b) by 472 days.

(21) Appl. No.: 12/588,043

(22) Filed: Oct. 1, 2009

(65) Prior Publication Data

US 2010/0085020 A1  Apr. 8, 2010

(30) Foreign Application Priority Data

| Oct. 8, 2008 | (JP) | 2008-261825 |
| Nov. 10, 2008 | (JP) | 2008-287765 |
| Jan. 8, 2009 | (JP) | 2009-002596 |
| Jan. 16, 2009 | (JP) | 2009-007664 |

(51) Int. Cl.
*H02J 7/04* (2006.01)
*H02K 7/14* (2006.01)
*E21B 3/00* (2006.01)
*F21L 4/00* (2006.01)

(52) U.S. Cl. ........ 320/157; 320/107; 320/112; 320/113; 320/114; 310/50; 173/214; 362/183

(58) Field of Classification Search .................. 320/157
See application file for complete search history.

(56) References Cited

U.S. PATENT DOCUMENTS

| 5,572,110 A | 11/1996 | Dunstan |
| 5,872,444 A | 2/1999 | Nagano et al. |
| 5,905,362 A | 5/1999 | Nagano et al. |
| 6,008,620 A | 12/1999 | Nagano et al. |
| 6,191,554 B1 * | 2/2001 | Nakane et al. ................ 320/114 |
| 6,225,783 B1 | 5/2001 | Nagano et al. |
| 6,229,280 B1 * | 5/2001 | Sakoh et al. .................. 320/106 |
| 6,268,710 B1 * | 7/2001 | Koga ............................. 320/116 |
| 6,924,624 B2 | 8/2005 | Baur et al. |
| 7,492,124 B2 | 2/2009 | Johnson et al. |
| 7,714,538 B2 * | 5/2010 | Johnson et al. ............... 320/114 |
| 2004/0263119 A1 | 12/2004 | Meyer et al. |
| 2005/0280393 A1 * | 12/2005 | Feldmann .................... 320/114 |
| 2006/0087285 A1 | 4/2006 | Phillips et al. |
| 2006/0118315 A1 * | 6/2006 | Suzuki et al. ..................... 173/2 |
| 2006/0180327 A1 | 8/2006 | Nagasaka et al. |
| 2006/0214627 A1 | 9/2006 | Ito et al. |

FOREIGN PATENT DOCUMENTS

| JP | A 09-285026 | 10/1997 |
| JP | A 2003-264008 | 9/2003 |
| JP | A 2006-218605 | 8/2006 |
| JP | A 2006-280043 | 10/2006 |
| JP | A 2007-082379 | 3/2007 |

* cited by examiner

OTHER PUBLICATIONS

Extended European Search Report received Sep. 24, 2010 issued in European Patent Application No. 09012649.1.

*Primary Examiner* — Yalkew Fantu
(74) *Attorney, Agent, or Firm* — Oliff & Berridge, PLC

(57) ABSTRACT

Each of a battery charger and a battery pack has a microcomputer. The respective microcomputers mutually perform data communication while the battery pack is being charged by the battery charger, and confirm an operational state of the microcomputer of the communication counterpart (mutual operation confirmation) based on a result of the data communication. When an abnormality of one of the microcomputers is detected, the other microcomputer executes a predetermined process for stopping charging.

13 Claims, 12 Drawing Sheets

FIG.1
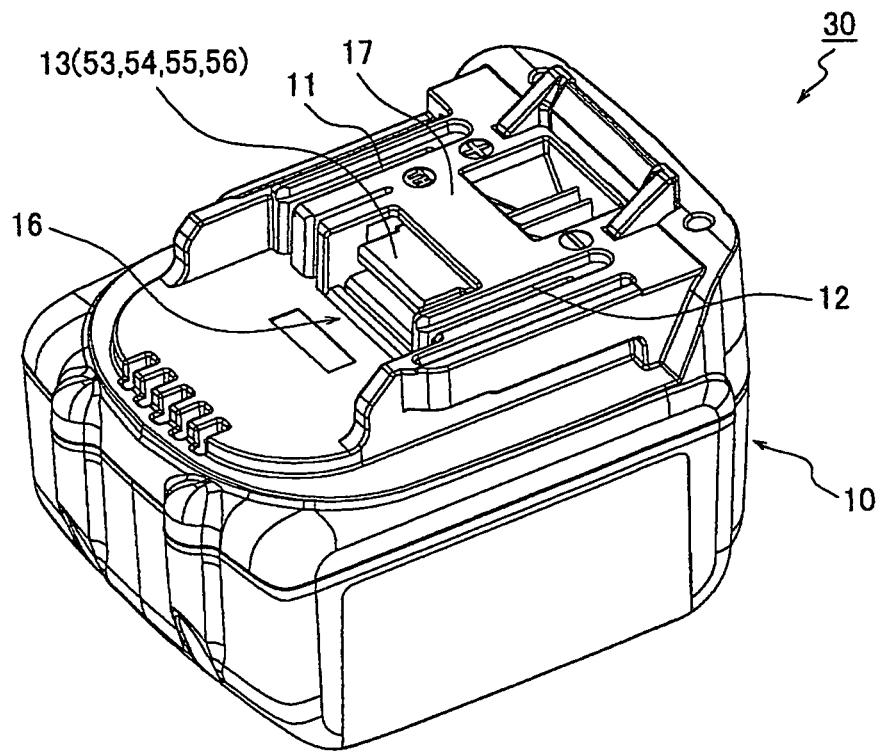
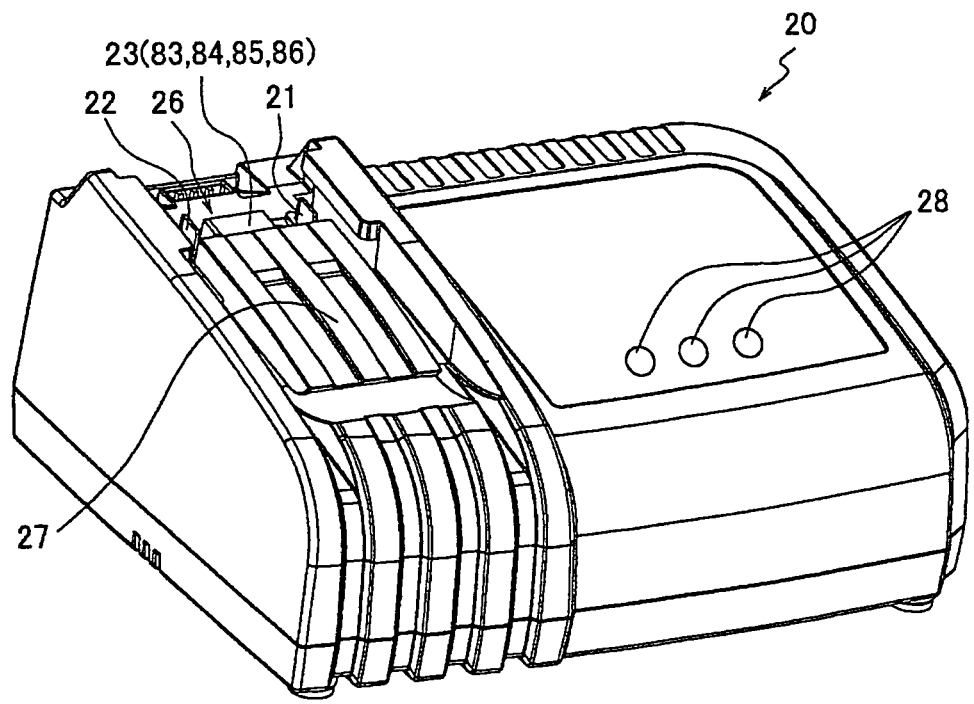

CHARGING SYSTEM FOR ELECTRIC POWER TOOL, BATTERY PACK FOR ELECTRIC POWER TOOL, AND BATTERY CHARGER FOR ELECTRIC POWER TOOL

CROSS-REFERENCE TO RELATED APPLICATIONS

This application claims the benefit of Japanese Patent Applications No. 2008-261825 filed Oct. 8, 2008, No. 2008-287765 filed Nov. 10, 2008, No. 2009-002596 filed Jan. 8, 2009, and No. 2009-007664 filed Jan. 16, 2009 in the Japan Patent Office, the disclosures of which are incorporated herein by reference.

BACKGROUND

The present invention relates to a charging system for electric power tool, a battery pack for electric power tool constituting the charging system, and a battery charger for electric power toll for charging the battery pack.

Conventionally, as a battery pack for electric power tool (hereinafter referred to as a "battery pack") having a rechargeable battery such as a lithium ion battery and a battery charger for electric power tool (hereinafter referred to as a "battery charger") for charging the battery pack, those including a microcomputer have been known.

Each of the battery pack and the battery charger has a microcomputer. Therefore, when the battery pack is charged by the battery charger, the charging operation can be meticulously controlled and monitored by the respective microcomputers, whereby proper charging is realized.

Unexamined Japanese Patent Publication No. H09-285026 discloses an example of a method for charging. In the disclosed method, the respective microcomputers mutually perform data communication so as to obtain necessary information thereby realizing more proper charging.

In the above example, for the charging, the microcomputer of the battery charger requests the microcomputer of the battery pack to transmit information indicating a maximum charging voltage and a maximum charging current. In response, the microcomputer of the battery pack transmits the requested information (stored in the battery pack) to the battery charger. After the start of charging, the microcomputer of the battery pack further transmits the present voltage value and the present current value of a battery cell (rechargeable battery) included in the battery pack itself.

The battery charger conducts switching controls between constant-current charge and constant-voltage charge in response to the voltage value of the rechargeable battery during the charging. Specifically, in the constant-current charging, the current is controlled not to exceed the maximum charging current. In the constant-voltage charging, the voltage is controlled not to exceed the maximum charging voltage. As described above, information is transmitted from the battery pack to the battery charger as needed, whereby more appropriate charging can be realized.

SUMMARY

However, in order to properly perform charge control by microcomputers, it is of course premised that both of the microcomputer of the battery pack and the microcomputer of the battery charger operate normally. If any one of the microcomputers malfunctions, charging is not normally performed, and thus the rechargeable battery may be damaged.

For example, even when the microcomputer of the battery pack malfunctions due to an abnormality, the microcomputer of the battery charger may continue the charge control without detecting the malfunction of the microcomputer of the battery pack. The microcomputer of the battery charger may perform the charge control based on the information from the malfunctioning microcomputer of the battery pack (the information is highly likely to be wrong in this case), whereby the rechargeable battery may be damaged.

On the other hand, when the microcomputer of the battery charger malfunctions due to an abnormality, the charge control is not normally performed by the battery charger, whereby the rechargeable battery may still be damaged.

One aspect of the present invention is to provide a charging system for electric power tool, in which each of a battery charger and a battery pack has a microcomputer. It is preferable that even if one of the microcomputers malfunctions due to an abnormality in charging, a rechargeable battery in the battery pack is not adversely affected.

A charging system for electric power tool according to a first aspect of the present invention includes a battery pack used for driving an electric power tool and a battery charger detachably mounted with the battery pack.

The battery pack includes a rechargeable battery, which serves as a power source for driving the electric power tool, and a battery-side microcomputer which is a microcomputer monitoring a state of the rechargeable battery. The battery charger includes a charging unit which supplies a charging power to the battery pack to charge the rechargeable battery, and a charger-side microcomputer which is a microcomputer controlling an operation of the charging unit.

At least while the rechargeable battery is charged by the charging unit, the battery-side microcomputer and the charger-side microcomputer mutually perform data communication, and execute mutual operation confirmation for confirming an operational state of a microcomputer of a communication counterpart based on a result of the data communication. When one of the battery-side microcomputer and the charger-side microcomputer detects an abnormality of the operational state of the microcomputer of the communication counterpart as a result of the mutual operation confirmation, the microcomputer having detected the abnormality executes a predetermined charge stop processing for stopping charging of the rechargeable battery.

In the charging system of the present invention configured as above, for example when the battery-side microcomputer detects an abnormality of the charger-side microcomputer, the battery-side microcomputer executes the charge stop processing. Further, when the charger-side microcomputer detects an abnormality of the battery-side microcomputer, the charger-side microcomputer executes the charge stop processing.

According to the charging system of the invention, when one of the microcomputers detects an abnormality of the other microcomputer as a result of the mutual operation confirmation, the microcomputer having detected the abnormality executes the charge stop processing for stopping the charging of the rechargeable battery. Therefore, the rechargeable battery in the battery pack is inhibited from being adversely affected due to the abnormality of the microcomputer.

There can be considered various timings for executing the mutual operation confirmation in the battery-side microcomputer and the charger-side microcomputer. For example, while the rechargeable battery is charged by the charging unit, the mutual operation confirmation may be executed at every specified predetermined time.

The mutual operation confirmation is executed at every specified time, whereby when an abnormality occurs in one of the microcomputers during charging, the abnormality can be quickly detected and the charging can be stopped.

Further, there can be considered various methods for the mutual operation confirmation. For example, each of the battery-side microcomputer and the charger-side microcomputer transmits to the microcomputer of the communication counterpart transmission data of a type previously determined for each of the microcomputers and confirms whether or not response data, corresponding to the transmission data, is transmitted from the microcomputer of the communication counterpart, whereby the mutual operation confirmation may better be executed.

As described above, each of the microcomputers confirms whether or not the response data, corresponding to the transmission data transmitted by its own microcomputer, is transmitted, whereby whether or not the microcomputer of the communication counterpart is normally operated can be reliably confirmed.

In the above case, when the response data is not received within a predetermined time in the mutual operation confirmation during charging of the rechargeable battery by the charging unit, the battery-side microcomputer and the charger-side microcomputer may preferably determine that the microcomputer of the communication counterpart is abnormal.

As described above, the abnormality is determined based on whether or not the response data is received within a predetermined time, whereby when an abnormality occurs in the microcomputer of the communication counterpart, the abnormality can be detected more reliably and quickly.

For the mutual operation confirmation, when the respective microcomputers confirm the operational state of the communication counterpart based on the response data corresponding to the transmission data, the mutual operation confirmation can be realized more specifically as follows.

That is, the mutual operation confirmation may be started when one microcomputer of the battery-side microcomputer and the charger-side microcomputer transmits predetermined first transmission data to the other microcomputer. The one microcomputer then confirms the operational state of the other microcomputer based on whether or not first response data, corresponding to the first transmission data, is transmitted from the other microcomputer after the one microcomputer transmits the first transmission data. The other microcomputer transmits the first response data (for the other microcomputer, corresponding to transmission data for the mutual operation confirmation) in response to the first transmission data from the one microcomputer and then confirms the operational state of the one microcomputer based on whether or not second response data, corresponding to the first response data, is transmitted from the one microcomputer.

As described above, the predetermined data communication (transmission and reception of each response data) is performed starting on the transmission of the first transmission data from one microcomputer, whereby the mutual operation confirmation can be efficiently performed.

In the charging system according to the invention, charging of the rechargeable battery of the battery pack may be controlled by the charger-side microcomputer. Therefore, especially when an abnormality occurs in the charger-side microcomputer, it is preferable that the abnormality is rapidly detected to stop charging.

Thus, as described above, when the mutual operation confirmation is executed starting on the transmission of the first transmission data from one microcomputer, one microcomputer transmitting the first transmission data is preferably the battery-side microcomputer, and the other microcomputer is preferably the charger-side microcomputer.

According to the charging system configured as above, the first transmission data is transmitted from the battery-side microcomputer to the charger-side microcomputer, whereby the mutual operation confirmation is started. Therefore, even if an abnormality occurs in the charger-side microcomputer, the battery-side microcomputer can reliably and quickly detect the abnormality to stop charging.

In the above case, more specifically, it is preferable that the battery-side microcomputer transmits, as the first transmission data, to the charger-side microcomputer, data that indicates a request for data communication, and the charger-side microcomputer transmits, as the first response data, to the battery-side microcomputer, data that indicates a request for information required to control the charging of the rechargeable battery performed by the charging unit, so that the battery-side microcomputer transmits information requested as the second response data.

According to the above configuration, while the mutual operation confirmation is properly executed, the charger-side microcomputer can obtain the information, required for the charge control, from the battery pack. Therefore, while the respective microcomputers monitor the microcomputer of the communication counterpart, the rechargeable battery is properly charged by the charger-side microcomputer.

A general microcomputer may be reset (initialized) caused by any factor (for example, instantaneous lowering of a power source) during its operation. Therefore, for example, the charger-side microcomputer may also be reset during its operation. If the charger-side microcomputer is reset, the battery-side microcomputer may determine that an abnormality occurs in the charger-side microcomputer and execute the charge stop processing even though an abnormality does not occur in the charger-side microcomputer itself.

Thus, as described above, the charging system, which is configured so that the mutual operation confirmation is performed starting on the transmission of the transmission data from the battery-side microcomputer, is preferably further configured as follows. That is, while the rechargeable battery is charged by the charging unit, the charger-side microcomputer transmits charge control information associated with a control state of the charging unit to the battery side microcomputer at every predetermined timing. While the rechargeable battery is charged, the battery-side microcomputer stores the charge control information in a storage section at every reception of the charge control information from the charger-side microcomputer. When after the transmission of the first transmission data, the battery-side microcomputer does not receive the first response data from the charger-side microcomputer within a predetermined time, a reset confirmation code that is data for confirming whether or not the charger-side microcomputer is reset is transmitted to the charger-side microcomputer. When the battery-side microcomputer receives predetermined third response data from the charger-side microcomputer in response to the reset confirmation code, a latest charge control information stored in the storage section is transmitted to the charger-side microcomputer. When the charger-side microcomputer receives the reset confirmation code from the battery-side microcomputer after starting an operation of the charger-side microcomputer, the charger-side microcomputer transmits the third response data and then starts a control of the charging unit based on the charge control information transmitted from the battery-side microcomputer after transmission of the third response data.

That is, during charging, the charger-side microcomputer transmits the charge control information at that time to the battery-side microcomputer at every predetermined timing, whereby the battery pack side (the battery-side microcomputer) stores the charge control information. When the charger-side microcomputer is reset during charging, the charger-side microcomputer obtains the latest charge control information (the charge control information transmitted to the battery-side microcomputer immediately before resetting) from the battery-side microcomputer and starts charging based on the obtained charge control information (starts the control of the charging unit).

According to the charging system configured as above, when the charger-side microcomputer is reset during charging, charging can be restarted to continue from the charge control state immediately before resetting, based on the charge control information immediately before resetting.

Further, in the charging system of the present invention, while the mutual operation confirmation is executed when the rechargeable battery is charged by the charging unit, the charger-side microcomputer may preferably suspend the charging (namely, the supply of the charging power).

Depending on the configuration of the charging unit, a noise may be generated in the generation and supply of the charging power. Further, the level of the noise varies depending on the configuration of the charging unit. When a noise is generated by the charging unit, the data communication between the respective microcomputers may not normally be performed due to the noise.

Thus, as described above, while the rechargeable battery is charged, the charging may be suspended during execution of the mutual operation confirmation, whereby the influence of the noise caused by the charging unit can be eliminated at least during execution of the mutual operation confirmation. Therefore, the mutual operation confirmation can be performed with high accuracy.

Further, in the charging system according to the present invention, the battery-side microcomputer and the charger-side microcomputer preferably execute the mutual operation confirmation before the rechargeable battery starts to be charged by the charging unit. When the normality of the respective microcomputers can be confirmed as a result of the mutual operation confirmation, the charger-side microcomputer preferably controls the charging unit so that the rechargeable battery is charged.

That is, the mutual operation confirmation may be executed not only during charging of the rechargeable battery but also before the start of charging of the rechargeable battery. Accordingly, when an abnormality of one of the microcomputers is detected as a result of the mutual operation confirmation before the start of charging, charging itself may not be performed. Therefore, an adverse effect on the rechargeable battery due to the abnormality of the microcomputer can be inhibited more reliably and satisfactorily.

The data communication for the mutual operation confirmation performed by the respective microcomputers may be performed via, for example, communication terminals exclusive for the data communication provided in the battery pack and the battery charger. The data communication may be performed by using a terminal provided for supply of a charging power.

That is, the battery pack may include a power receiving terminal and a battery-side data transmission/reception circuit. The power receiving terminal may be used for receiving a charging power supplied from the battery charger. The battery-side data transmission/reception circuit may be provided between the battery-side microcomputer and the power receiving terminal for the purpose of performing data communication by the battery-side microcomputer with the charger-side microcomputer via the power receiving terminal. The battery charger may include a power supply terminal and a charger-side data transmission/reception circuit. The power supply terminal may be used for supplying a charging power to the battery pack. The charger-side data transmission/reception circuit may be provided between the charger-side microcomputer and the power supply terminal for the purpose of performing data communication by the charger-side microcomputer with the battery-side microcomputer through the power supply terminal.

According to the charging system configured as above, the data communication may be performed by using the terminals for supplying a charging power (i.e. the power receiving terminal and the power supply terminal). Therefore, a terminal exclusively for data communication may not be required to be provided separately from those terminals, whereby the configurations of the battery pack and the battery charger can be simplified, and, at the same time, cost reduction can be realized.

A battery pack for electric power tool according to a second aspect of the present invention constitutes the charging system of the invention described above. In the battery pack of the invention, when an abnormality of the charger-side microcomputer is detected, a charge stop processing may be executed to stop charging of the rechargeable battery. Therefore, the rechargeable battery in the battery pack can be inhibited from being adversely affected due to the abnormality of the charger-side microcomputer. Further, when an abnormality occurs in its own microcomputer (the battery-side microcomputer), the abnormality may be detected by the charger-side microcomputer, and the charge stop processing may be executed by the charger-side microcomputer. Therefore, the rechargeable battery in the battery pack can be inhibited from being adversely affected due to the abnormality of its own microcomputer.

A battery charger for electric power tool according to a third aspect of the present invention constitutes the charging system of the invention described above. In the battery charger of the invention, when an abnormality of the battery-side microcomputer is detected, the charge stop processing may be executed to stop charging of the rechargeable battery. Therefore, the rechargeable battery in the battery pack can be inhibited from being adversely affected due to the abnormality of the battery-side microcomputer. Further, even when an abnormality occurs in its own microcomputer (the charger-side microcomputer), the abnormality may be detected by the battery-side microcomputer, and the charge stop processing may be executed by the battery-side microcomputer. Therefore, the rechargeable battery in the battery pack can be inhibited from being adversely affected due to the abnormality of its own microcomputer.

BRIEF DESCRIPTION OF THE DRAWINGS

Preferred embodiments of the present invention will be described by way of example with reference to the accompanying drawings, in which:

FIG. 1 is a perspective view showing an appearance of a battery pack for electric power tool and a battery charger for electric power tool constituting a charging system for electric power tool according to embodiments;

DETAILED DESCRIPTION OF THE PREFERRED EMBODIMENTS

[First Embodiment]

Figure 2:
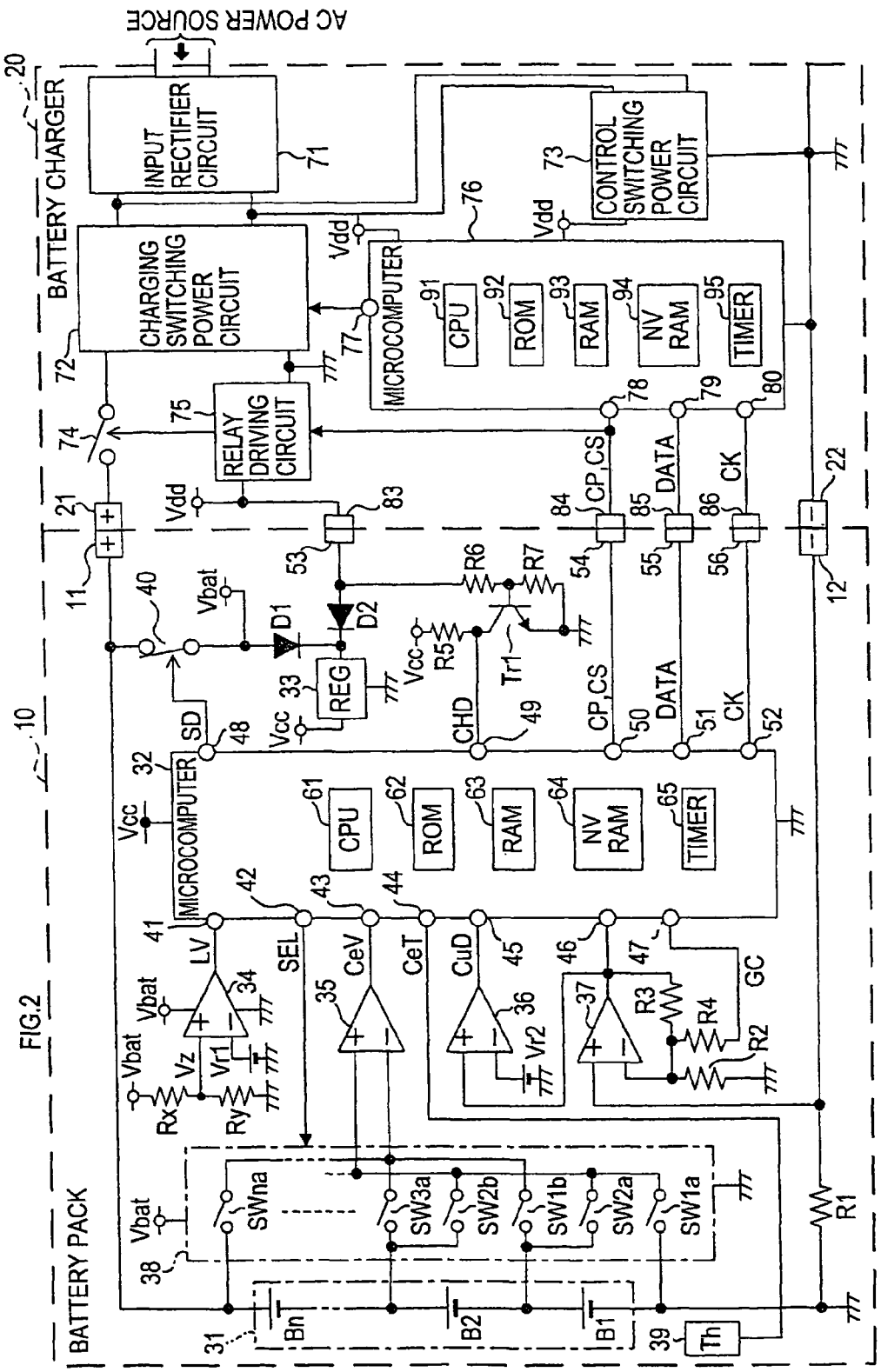
FIG. 2 is an electric circuit diagram showing an electrical configuration of the charging system according to a first embodiment.

(1) Overall Configuration of Charging System for Electric Power Tool

In FIG. 1, a battery pack 10 for electric power tool (hereinafter referred to as a "battery pack") that constitutes a charging system 30 for electric power tool is detachably attached to various types of electric power tools, such as a rechargeable impact driver, a rechargeable driver drill, and a rechargeable impact wrench (they are mere examples). The battery pack 10 is used for supplying a driving power to such power tools. The battery pack 10 includes therein a battery 31 as a power source (see, FIG. 2).

The battery pack 10 includes a battery-side attachment portion 17 formed on one side thereof. The battery-side attachment portion 17 is attached to a charger-side attachment portion 27 of a battery charger 20 or to a tool body of the electric power tool. At a predetermined position in the battery-side attachment portion 17, a battery-side terminal 16 is further provided. The terminal 16 is electrically connected to charger-side terminal 26 of the battery charger 20 or a tool-side terminal (not shown) of the tool body.

The terminal 16 is configured to include a battery-side positive terminal 11, a battery-side negative terminal 12, and battery-side signal terminal groups 13. The terminals 11 and 12 are energized by charge/discharge current. The terminal groups 13 are composed of a plurality of terminals including at least a battery charger connecting signal input terminal 53, a charge permission/stop signal output terminal 54, a data input/output terminal 55, and a clock input terminal 56 (see, FIG. 2).

The battery charger 20 generates a direct-current charging power source (charging power) of a predetermined voltage for charging the battery 31 inside the battery pack 10 from a not-shown external input power source (in the present embodiment, an AC 100V power source). The battery charger 20 includes the charger-side attachment portion 27 formed on one end side of an upper surface of the battery charger 20. The battery pack 10 is attached to the charger-side attachment portion 27. At a predetermined position in the charger-side attachment portion 27 (inside the charger-side attachment portion 27), the charger-side terminal 26 is further provided.

The terminal 26 is configured to include a charger-side positive terminal 21, a charger-side negative terminal 22, and charger-side signal terminal groups 23. The terminals 21 and 22 are configured to supply the direct-current charging power source to the battery pack 10. The terminal groups 23 are composed of a plurality of terminals including at least a battery charger connecting signal output terminal 83, a charge permission/stop signal input terminal 84, a data input/output terminal 85, and a clock output terminal 86 (see, FIG. 2).

The battery charger 20 further includes a display portion 28 provided with three LEDs. The display portion 28 externally indicates an operational state of the battery charger 20, a charging status of the battery pack 10, and the like.

In the charging system 30 for electric power tool constituted as above, when the battery-side attachment portion 17 of the battery pack 10 is attached to the charger-side attachment portion 27 of the battery charger 20, both of the terminals 16 and 26 are electrically connected to each other.

More specifically, the terminal 11 of the battery pack 10 is connected to the terminal 21 of the battery charger 20. The terminal 12 of the battery pack 10 is connected to the terminal 22 of the battery charger 20. The terminals 53, 54, 55, and 56 constituting the terminal groups 13 are respectively connected to the terminals 83, 84, 85, and 86 constituting the terminal groups 23 (see, FIG. 2). In this state, it becomes possible to charge the battery 31 inside the battery pack 10 by the battery charger 20.

(2) Electrical Configuration of Charging System for Electric Power Tool

An electrical configuration of the charging system 30 for electric power tool will now be described with reference to FIG. 2. FIG. 2 shows a state in which the battery pack 10 is attached to the battery charger 20. In FIG. 2, the battery pack 10 and the battery charger 20 are electrically connected to each other.

Firstly, an electrical configuration of the battery pack 10 will be described. As shown in FIG. 2, the battery pack 10 includes the battery 31, a microcomputer 32 and a battery-side regulator 33. The microcomputer 32 collectively carries various controlling functions in the battery pack 10. In particular, the microcomputer 32, for example, controls a charge/discharge of the battery 31 and monitors a status of the battery 31. The regulator 33 generates a battery-side control voltage Vcc (a DC power source of a voltage Vcc) using electric power of the battery 31 as input for operating various circuits inside the battery pack 10. The terminal 11 is connected to a positive side of the battery 31. The terminal 12 is connected to a negative side of the battery 31.

The battery 31 is configured by connecting a plurality of battery cells B1, B2, ..., and Bn in series. In the present embodiment, respective battery cells B1, B2, ..., and Bn each can be lithium-ion rechargeable batteries having a normal voltage of 3.6 V, and four lithium-ion rechargeable batteries can be connected in series. Therefore, in this example, a total voltage of the battery 31 (hereinafter referred to as "battery voltage") Vbat is approximately 14.4 V in a normal state.

When the battery pack 10 attached to the power tool body is used, the electric power of the battery 31 is supplied to the tool body via the terminals 11 and 12. When the battery 31 is charged by the battery charger 20, the direct-current charging power source from the battery charger 20 is supplied to the battery 31 via the terminals 11 and 12, as explained later.

The battery voltage Vbat is inputted to the regulator 33 through a shutdown switch 40 and a diode D1. The regulator 33 generates the power source Vcc. The shutdown switch 40 is turned on/off in accordance with a shutdown signal SD from the microcomputer 32. Details of the on/off control will be described later. The shutdown switch 40 is generally turned on as long as the battery 31 is in a normal state. Therefore, the battery voltage Vbat is generally inputted to the regulator 33 through the shutdown switch 40 and the diode D1. The regulator 33 generates the power source Vcc based on the battery voltage Vbat inputted to the regulator 33.

As shown in FIG. 2, a circuit operated with the power source (control voltage) Vcc and a circuit operated with the battery voltage Vbat are present in a mixed manner in the battery pack 10. The battery voltage Vbat inputted through the shutdown switch 40 is inputted to an anode of the diode D1. The battery voltage Vbat is also inputted to each circuit operated by the battery voltage Vbat in the battery pack 10.

The battery pack 10 further includes a cell selecting switch 38, a differential amplifying circuit 35, a temperature detecting circuit 39, the under-voltage detecting comparator 34, a current detecting resistor R1, a non-inverting amplifying circuit, a discharge detecting comparator 36, and a charger detecting transistor Tr1.

The switch 38 selectively outputs one of voltages (hereinafter referred to as "cell voltage") of the battery cells B1, B2, Bn in the battery 31.

The circuit 35 amplifies a voltage of the one of the battery cells selected by the switch 38, and Outputs the amplified voltage as a cell voltage signal CeV.

The circuit 39 is provided in the vicinity of the battery 31. The circuit 39 detects a temperature of the battery cell (hereinafter referred to as "cell temperature") and outputs the temperature as a cell temperature signal CeT.

The comparator 34 compares a divided battery voltage value Vz obtained by dividing the battery voltage Vbat by voltage divider resistors Rx and Ry with a predetermined first reference voltage Vr1. Then the comparator 34 outputs the comparison result as the under-voltage detection signal LV.

The resistor R1 is used to detect a discharge current at the time of discharge from the battery 31 to the power tool body.

The non-inverting amplifying circuit includes an operational amplifier 37 and resistors R2, R3, and R4. The non-inverting amplifying circuit is used to generate a discharge current signal by amplifying the current detected by the resistor R1 (i.e., a voltage signal corresponding to a current value) with a predetermined gain.

The comparator 36 compares the discharge current signal amplified by the non-inverting amplifying circuit with a predetermined second reference voltage Vr2. Then, the comparator 36 outputs the comparison result as a discharge detection signal CuD.

The transistor Tr1 is used to detect that the battery charger 20 is connected.

As the transistor Tr1, an NPN-type bipolar transistor is used in the present embodiment by way of example only.

The cell selecting switch 38 is operated with the battery voltage Vbat. The switch 38 is configured so that, in accordance with a cell selection signal SEL from the microcomputer 32, a voltage in one of the battery cells indicated by the cell selection signal is outputted and then inputted to the circuit 35. As illustrated, the cell selecting switch 38 includes a plurality of switches SW1a, SW2a, SW1b, SW2b, SW3a, SWna.

The switch SW1a is connected between a negative electrode of the battery cell B1 and a non-inverting input terminal of the circuit 35. The switch SW1b is connected between a positive electrode of the battery cell B1 and an inverting input terminal of the circuit 35. In the cell selecting switch 38 configured as above, in a case, for example, where the battery cell B1 with the lowest potential is selected by the cell selection signal SEL, the switches SW1a and SW1b are turned on, and the other switches are all turned off. As a result, a voltage of the selected battery cell B1 is inputted from the cell selecting switch 38 to the circuit 35.

The circuit 35 is operated with the control voltage Vcc. The voltage inputted from the cell selecting switch 38 (i.e., a potential difference of the selected any one of the battery cells) is amplified by the circuit 35 and inputted to the microcomputer 32 as a cell voltage signal CeV.

The circuit 39 is configured as a known temperature sensor including a thermo-sensitive device such as a thermistor. The thermo-sensitive device is provided in the vicinity of each battery cell in the battery 31. Various configurations can be used as to where the thermo-sensitive device is to be provided or how many thermo-sensitive devices are to be provided. For example, one thermo-sensitive device may be provided and a detection result based on the device may be regarded as a cell temperature of each battery cell. Alternatively, thermo-sensitive devices may be separately provided for each of the battery cells, and a cell temperature may be individually detected with respect to each battery cell. In the present embodiment, explanation is given based on the former (the case where one thermo-sensitive device is provided) to simplify the description.

The comparator 34 is operated with the battery voltage Vbat (or the control voltage Vcc). The comparator 34 outputs the under-voltage detection signal of high (H) level to the microcomputer 32 in a normal state where the divided battery voltage value Vz is equal to or greater than the first reference voltage Vr1. On the other hand, in a case where the battery voltage Vbat is decreased, and the voltage value Vz thereby falls below the voltage Vr1, the comparator 34 outputs the under-voltage detection signal of low (L) level to the microcomputer 32. The comparator 34 is intended to inhibit overdischarge of the battery 31, and detects when the battery 31 is almost in an overdischarge state. Accordingly, the voltage Vr1 is appropriately set to a value which makes it possible to detect when the battery 31 is almost in the overdischarge state.

The resistor R1 is provided on a current-carrying path extending from the terminal 12 to a negative electrode of the battery 31 (a negative electrode of the battery cell B1 with the lowest potential). A voltage drop (a voltage signal) caused by a discharge current at the resistor R1 is inputted to the operational amplifier which constitutes the non-inverting amplifying circuit.

The non-inverting amplifying circuit basically includes the operational amplifier 37 which is operated with the control voltage Vcc, and has a known configuration. The voltage signal detected by the resistor R1 is inputted to the non-inverting input terminal. The inverting input terminal is connected to a ground line (a ground potential) through the resistor R2. The inverting input terminal is also connected to an output terminal through the resistor R3. In the present embodiment, which has the above configuration as a basis, the resistor R4 is further connected between the inverting input terminal and the microcomputer 32. The gain of the non-inverting amplifying circuit can be switched between two levels with this configuration.

One end of the resistor R4 is connected to the inverting input terminal of the operational amplifier 37, and the other end is connected to a gain switch signal output port 47 of the microcomputer 32. The microcomputer 32 achieves gain switching of the non-inverting amplifying circuit by switching the port 47 between a high impedance and an L-level output.

When an amount of the discharge current is larger, e.g., at the time when the electric power tool is in use, a high impedance signal is outputted as a gain switch signal GC. This makes it possible to appropriately detect the large amount of discharge current (e.g., a heavy current of several tens of amperes). On the other hand, when an amount of the discharge current has a small value (e.g., approximately 0 A), an L-level signal is outputted as a gain switch signal GC to increase the gain of the non-inverting amplifying circuit. This makes it possible to accurately detect even a very small electric current. As above, by switching the gain of the non-inverting amplifying circuit in accordance with the value of the discharge current, the microcomputer 32 is able to appropriately detect a discharge current regardless of the amount of such discharge current.

The comparator 36 is operated with the control voltage Vcc. The comparator 36 outputs the discharge detection signal CuD of H level to the microcomputer 32 in a case where the discharge current signal outputted from the operational amplifier 37 is equal to or greater than the second reference voltage Vr2. On the other hand, in a case where the discharge current signal outputted from the operational amplifier 37 is smaller than the voltage Vr2, the comparator 36 outputs the discharge detection signal CuD of L level to the microcomputer 32. The comparator 36 is intended to detect when power supply to the power tool body is started.

In the transistor Tr1, a base is connected to the terminal 53 via a resistor R6, an emitter is connected to a ground potential, and a collector is connected to the power source Vcc via a resistor R5. The collector is also connected to the input port 49 of the microcomputer 32.

When the battery pack 10 is attached to the battery charger 20, the control voltage Vdd (which will be described in detail later) generated inside the battery charger 20 is inputted as a charger connection signal to the base of the transistor Tr1 via the terminal 53 and the resistor R6. As a result, the transistor Tr1 is turned on. Also, a potential of the collector of the transistor Tr1, that is, a charger connection detection signal CHD to be inputted to the microcomputer 32, becomes L level.

When the battery charger 20 is not connected to the battery pack 10, the transistor Tr1 is turned off. Also, the charger connection detection signal CHD to be inputted to the microcomputer 32 becomes H level due to the control voltage Vcc to be inputted through the resistor R5. On the other hand, when the battery charger 20 is connected to the battery pack 10, the transistor Tr1 is turned on as above due to the charger connection signal (voltage Vdd) from the battery charger 20, whereby the charger connection detection signal CHD to be inputted to the microcomputer 32 becomes L level. Therefore, the microcomputer 32 can determine whether or not the battery charger 20 is connected based on a level of the charger connection detection signal CHD.

Further, the charger connecting signal (the voltage (power source) Vdd) inputted from the battery charger 20 to the battery pack 10 is inputted to the regulator 33 through a diode D2. The regulator 33 is configured so as to be capable of generating the voltage (power source) Vcc based on either one of the battery voltage Vbat inputted through the diode D1 or the power source Vdd inputted through the diode D2, whichever whose voltage value is larger.

That is, the regulator 33 generates the power source Vcc basically based on the battery voltage Vbat inputted through the shutdown switch 40 and the diode D1.

When over-discharge of the battery 31 is detected by the detection signal LV from the comparator 34, the microcomputer 32 outputs a shutdown signal from a shutdown signal output terminal 48 to turn off the shutdown switch 40. Accordingly, the mode is shifted to a shutdown mode where the input of the battery voltage Vbat to the regulator 33 is interrupted, the generation of the power source Vcc is stopped, and the operation of the microcomputer 32 itself is stopped.

In order to return the microcomputer 32 from the shutdown mode to a normal operational state (normal operational mode), charging is required to be performed by mounting the battery pack 10 to the battery charger 20. When the battery pack 10 is mounted to the battery charger 20, the power source Vdd is inputted to the regulator 33 through the terminal 53 and the diode D2. Accordingly, generation of the power source Vcc is started again, and the microcomputer 32 is started to return to the normal operational mode. When returning to the normal operational mode, the microcomputer 32 turns on the shutdown switch 40 again. Therefore, after turning on of the shutdown switch 40, the regulator 33 again generates the power source Vcc based on the battery voltage Vbat.

The microcomputer 32 has a known configuration including, as hardware, a CPU 61, a ROM 62, a RAM 63, an NVRAM (a nonvolatile memory) 64, and a timer 65. The microcomputer 32 is operated with the power source Vcc, generated by the regulator 33. The microcomputer 32 executes various controls in accordance with various programs stored in the ROM 62.

The microcomputer 32 is provided with, as ports for inputting/outputting a signal, a voltage reduction detection signal input port 41, a cell selection signal output port 42, a cell voltage signal input port 43, a cell temperature signal input port 44, a discharge detection signal input port 45, a discharge current signal input port 46, a gain switch signal output port 47, a shutdown signal output port 48, a charger connection detection signal input port 49, a charge permission/stop signal output port 50, a data communication port 51, a clock signal input port 52, and the like.

The detection signal LV from the comparator 34 is inputted to the port 41. The port 42 outputs the cell selection signal SEL to the cell selecting switch 38. The cell voltage signal CeV from the circuit 35 is inputted to the port 43. The cell temperature signal CeT from the circuit 39 is inputted to the port 44. The discharge detection signal CuD from the comparator 36 is inputted to the port 45. The discharge current signal from the operational amplifier 37 is inputted to the port 46. The port 47 outputs the gain switch signal GC. The port 48 outputs the shutdown signal SD that controls the shutdown switch 40. The detection signal CHD is inputted from the transistor Tr1 to the port 49. The port 50 outputs a charge permission/stop signal (a charge permission signal CP and a charge stop signal CS) to the battery charger 20. The port 51 inputs and outputs various data DATA in the data communication performed with a microcomputer 76 in the battery charger 20. A clock signal CK is inputted to the port 52 from the microcomputer 76 in the battery charger 20.

The microcomputer 32 has a monitor function of monitoring the state of the battery 31 based on the above signals inputted to the microcomputer 32. The microcomputer 32 has a mutual operation confirmation function of performing the data communication with the microcomputer 76 of the battery charger 20 and confirming the operational state of the microcomputer 76 based on the result of the data communication.

That is, in the charging system 30 of the present embodiment, the microcomputer 32 of the battery pack 10 and the microcomputer 76 of the battery charger 20 are configured to execute the mutual operation confirmation in which they are mutually perform the data communication and confirm the operational state of the microcomputer of the communication counterpart based on the result of the data communication.

The microcomputer 32 of the battery pack 10 is configured to perform data communication communication) with the microcomputer 76 of the battery charger 20 by means of an IIC (Inter-IC) bus. The microcomputer 32 includes two ports 51 and 52 for the data communication. The data outputted from the port 51 is inputted to the microcomputer 76 (a data communication port 79) in the battery charger 20 through the terminal 55 of the battery pack 10 and the terminal 85 of the battery charger 20. The clock signal CK outputted from an output port 80 of the microcomputer 76 in the battery charger 20 is inputted to the port 52 through the terminal 86 of the battery charger 20 and the terminal 56 of the battery pack 10.

It is a mere example that the data communication between the microcomputers 32 and 76 is the IIC communication, and a different communication method (communication protocol) for the data communication can be suitably employed.

In a battery-side charge control process to be described later, the microcomputer 32 of the battery pack 10 appropriately outputs the charge permission signal (H level signal) CP or the charge stop signal (L level signal) CS to thereby turn on/off an energization switch 74 in the battery charger 20. Specifically, when the signal CP is outputted for permitting charging, the signal CP is inputted to a relay driving circuit 75 in the battery charger 20 via the terminals 54 and 84, whereby the relay driving circuit 75 is operated to turn on the energization switch 74. On the other hand, when the signal CS is outputted for stopping charging, the relay driving circuit 75 in the battery charger 20 turns off the energization switch 74 in accordance with the signal CS.

When the microcomputer 32 in the battery pack 10 detects the abnormality of the communication counterpart (the microcomputer 76 in the battery charger 20) as a result of the mutual operation confirmation based on the data communication described above, the microcomputer 32 executes an error processing (charge stop processing) for stopping the charging of the battery 31. Specifically, the signal CS is outputted to the battery charger 20, whereby the relay driving circuit 75 is operated to turn off the energization switch 74.

Next, an electrical configuration of the battery charger 20 will be described. The battery charger 20 is provided with an input rectifier circuit 71, a charging switching power supply circuit 72, a controlling switching power supply circuit 73, the microcomputer 76, and the relay driving circuit 75.

The circuit 71 rectifies an external power source (an AC 100 V power source in this embodiment) into a direct current power source.

The circuit 72 generates a charging power for charging the battery 31 from the direct current power source rectified by the circuit 71.

The circuit 73 generates the power source Vdd (a direct current power source having a voltage Vdd) for operating various circuits in the battery charger 20 from the direct current power source rectified by the circuit 71.

The microcomputer 76 controls generation of the charging power by the circuit 72. In other words, the microcomputer 76 controls charging of the battery 31.

The relay driving circuit 75 turns on/off the energization switch 74 based on the charge permission/stop signal from the battery pack 10.

The battery charger 20 of the present embodiment is configured to perform charging of the battery 31 by a constant current control or a constant voltage control. Switching between the above controls is performed in accordance with a charge control command from the microcomputer 76. Thus, when charging is performed by the constant current control, the circuit 72 generates charging current having a constant current value as charging power. Then, the generated charging current is supplied to the battery pack 10. On the other hand, when charging is performed by the constant voltage control, the circuit 72 generates charging voltage having a constant voltage value as charging power. Then, the generated voltage is supplied to the battery pack 10.

The charging power generated, by the circuit 72 is supplied to the battery pack 10 through the positive terminal 21 and the negative terminal 22 of the battery charger 20. In the battery charger 20, the energization switch 74 is provided on a supply path of the charging power extending from the circuit 72 to the positive terminal 21. Therefore, when the energization switch 74 is turned on, the charging power can be supplied to the battery pack 10. On the other hand, when the energization switch 74 is turned off, the charging power cannot be supplied to the battery pack 10.

The circuit 75 is configured so as to turn on the energization switch 74 when the charge permission signal CP (H level signal) is outputted from the battery pack 10 and turn off the energization switch 74 when the charge stop signal CS (L level signal) is outputted from the battery pack 10.

The terminal 84 of the battery charger 20 is pulled up to the power source Vdd via a pull-up resistor (not shown) of the circuit 75. Therefore, when the battery pack 10 is not mounted to the battery charger 20, the potential of the terminal 84 is H level (in the vicinity of Vdd), whereby the energization switch 74 is turned on.

When the battery pack 10 is attached to the battery charger 20, the terminal 84 is connected to the port 50 of the microcomputer 32 in the battery pack 10. At this time, before the start of charging, the charge permission signal CP (H level signal) is not yet outputted from the port 50, and the port 50 is pulled down to the ground potential through a pull-down resistor in the microcomputer 32. Therefore, the potential of the terminal 84 in the battery charger 20 is fluctuated (is lowered) when the battery pack 10 is attached. Accordingly, the energization switch 74 is turned off. Thereafter, when charging is started after the preparation of charging is completed, the microcomputer 32 of the battery pack 10 outputs the charge permission signal CP to thereby raise the potential of the terminal 84 to the H level (in the vicinity of Vdd). Accordingly, the energization switch 74 is turned on.

The microcomputer 76 of the battery charger 20 has a known configuration including, as hardware, a CPU 91, a ROM 92, a RAM 93, a NVRAM (a nonvolatile memory) 94, and a timer 95. The microcomputer 76 is operated with the power source Vdd, generated by the circuit 73. The microcomputer 76 executes various controls in accordance with various programs stored in the ROM 92.

Further, the microcomputer 76 includes, as ports for inputting/outputting a signal/data, a charge control instruction output port 77, a battery connection detection port 78, a data communication port 79, a clock signal output port 80 and the like.

The port 77 outputs a charge control instruction for charge control to the circuit 72.

The port 79 inputs and outputs various data DATA in the data communication performed with the microcomputer 32 of the battery pack 10.

The port 80 outputs the clock signal CK used in IIC communication.

The microcomputer 76 performs the data communication with the microcomputer 32 of the battery pack 10 to thereby suitably obtain information required for charge control. The microcomputer 76 has also a mutual operation confirmation function for confirming the operational state of the microcomputer 76 of the battery charger 20 based on the result of the data communication. When the microcomputer 76 detects an abnormality of the microcomputer 32 of the battery pack 10 on the communication counterpart as a result of the mutual operation confirmation, the microcomputer 76 executes an error processing (charge stop processing) for stopping the charging of the battery 31. Specifically, the supply of the charging power to the battery pack 10 is stopped by stopping the operation of the circuit 72.

Further, the microcomputer 76 detects whether or not the battery pack 10 is connected (mounted) based on the potential fluctuation of the port 78 (=the potential fluctuation of the terminal 84). That is, as described above, when the battery pack 10 is mounted to the battery charger 20, the potential of the terminal 84 of the battery charger 20 (=the potential of the detection port 78) is fluctuated. The microcomputer 76 detects whether or not the battery pack 10 is mounted to the battery charger 20 based on the potential fluctuation.

(3) Charge Control Process by Respective Microcomputers

Next, a description will be given of a charge control process (including the data communication between the microcomputers 32 and 76 and the mutual operation confirmation based on the data communication) with reference to FIGS. 3A to 10. The charge control process is performed in the microcomputers 32 and 76 when the battery pack 10 is mounted to the battery charger 20.

(3-1) Summary of Charge Control Process

Here, prior to the detailed description of the charge control process performed in the microcomputers 32 and 76, the summary thereof will be described with reference to FIGS. 3A, 3B, and 4. In the following description, the microcomputer 32 of the battery pack 10 is also referred to as the "battery-side microcomputer 32", and the microcomputer 76 of the battery charger 20 is also referred to as the "charger-side microcomputer 76".

Figure 3A:
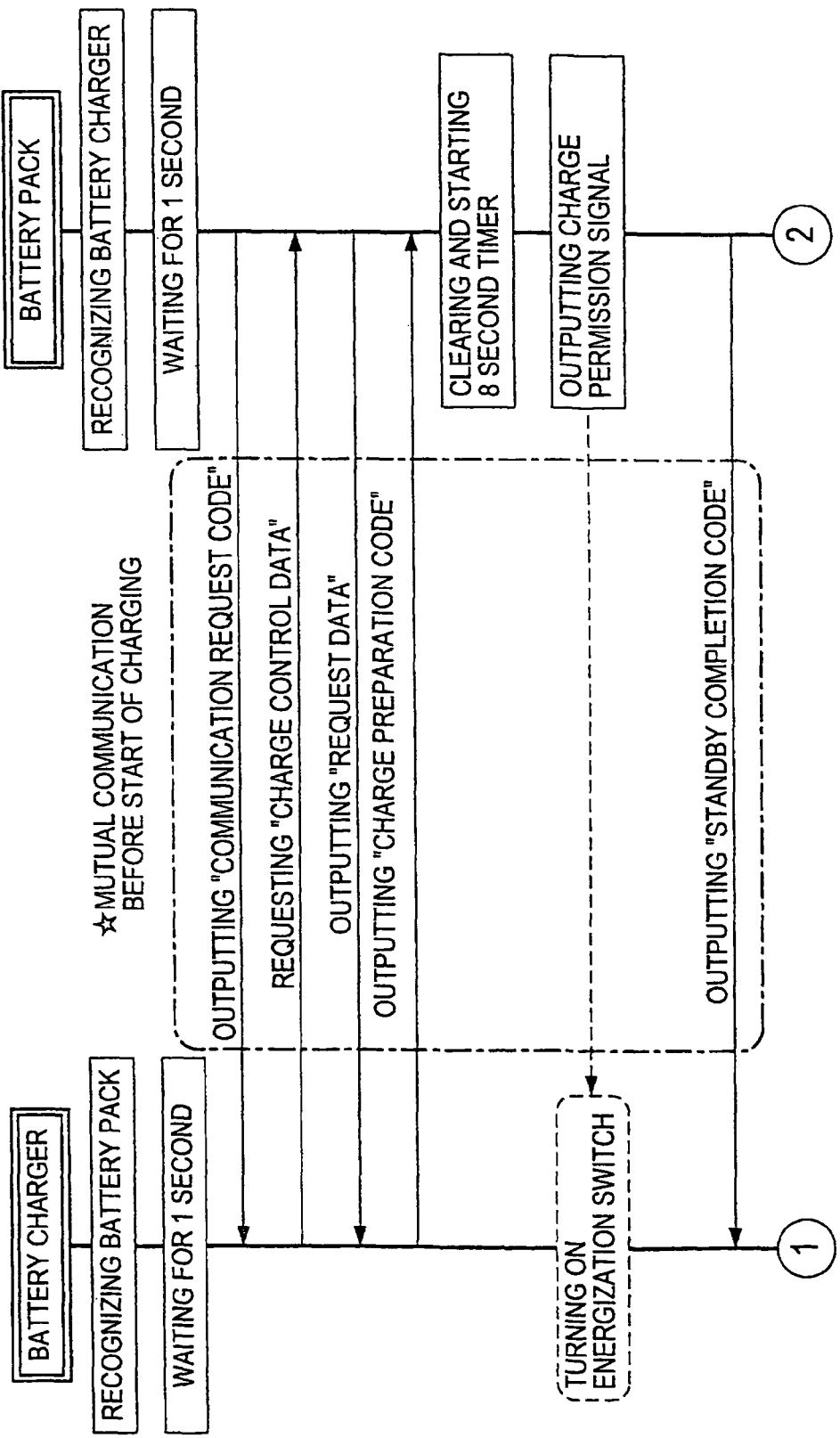
FIGS. 3A and 3B are sequence diagrams shown by associating a main operation of a battery-side microcomputer with that of a charger-side microcomputer.
Figure 3B:
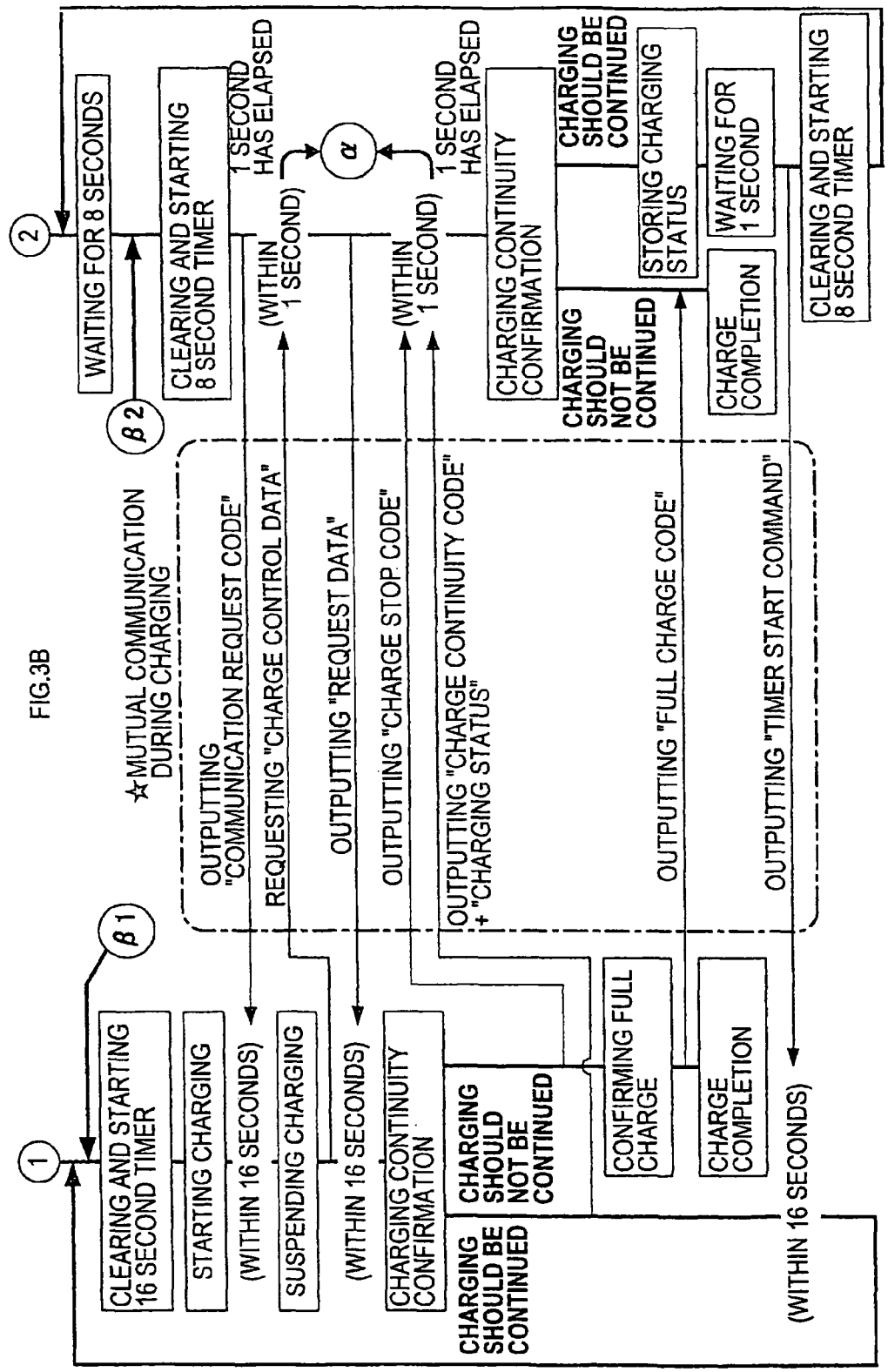

As shown in FIGS. 3A and 3B, in the charging system 30 of the present embodiment, the microcomputers 32 and 76 first wait for 1 second upon confirming connection of the battery pack 10 and the battery charger 20, respectively. The data communication is then started from the battery-side microcomputer 32. That is, the battery-side microcomputer 32 first outputs (transmits) a communication request code, and in response, the charger-side microcomputer 76 requests charge control data (transmits a request command). In response to the request, the battery-side microcomputer 32 outputs the requested data. When a charge preparation code is outputted from the charger-side microcomputer 76 in response to the output of the battery-side microcomputer 32, an 8 second timer is cleared and started. The battery-side microcomputer 32 further outputs the charge permission signal CP to turn on the energization switch 74 of the battery charger 20, and, thus, to output a standby completion code. The 8 second timer is realized by the timer 65 in the battery-side microcomputer 32.

When the charger-side microcomputer 76 receives the standby completion code, the microcomputer 76 clears and starts a 16 second timer to start the charge of the battery 31 (that is, the supply of the charging power by the circuit 72 is initiated). After the start of charging (actually, after the start of the 16 second timer), the charger-side microcomputer 76 waits for the transmission of the communication request code from the battery-side microcomputer 32. The 16 second timer is realized by the timer 95 in the charger-side microcomputer 76.

The battery-side microcomputer 32 waits for 8 seconds after outputting the standby completion code (actually, after the start of the 8 second timer). The rechargeable battery is charged while the battery-side microcomputer 32 is waiting. After 8 seconds has elapsed, the battery-side microcomputer 32 again clears and starts the 8 second timer to output the communication request code to the charger-side microcomputer 76.

Upon receiving the communication request code within 16 seconds from the start of the 16 second timer, the charger-side microcomputer 76 suspends the operation of the circuit 72 to temporarily suspend charging, and, thus, to request the charge control data (such as the present battery voltage Vbat and the present battery temperature) to the battery-side microcomputer 32. When the charger-side microcomputer 76 cannot receive the communication request code within 16 seconds, the microcomputer 76 performs the error processing for stopping charging.

Upon receiving the request for the charge control data from the charger-side microcomputer 76 within 1 second after the restart of the 8 second timer, the battery-side microcomputer 32 transmits the requested data.

Upon receiving the requested data within 16 seconds after the start of the 16 second timer, the charger-side microcomputer 76 performs a charge continuity confirmation process with regard to whether or not charging is allowed to be continued, based on the received data.

When charging should be continued, a charge continuity code and a charging status are transmitted from the microcomputer 76. Thereafter, when a timer start command is received from the battery-side microcomputer 32 within 16 seconds from the start of the 16 second timer, the 16 second timer is cleared and started, and then charging is started (restarted). The charging status corresponds to an example of the charge control information according to the present invention. The charging status is various information concerning the control state when the charger-side microcomputer 76 controls the circuit 72 to control the supply of the charging power (in other words, to control charging of the battery 31).

Meanwhile, when charging should not be continued, a charge stop code is outputted. After it is confirmed that the battery 31 is in a full charge state, a full charge code is outputted to the battery-side microcomputer 32 to perform a charge completion process.

When, after transmitting the requested data in response to the request for the charge control data from the battery charger 20, the battery-side microcomputer 32 receives the charge stop code, or the charge continuity code and the charging status from the charger-side microcomputer 76 within 1 second after the start of the 8 second timer, the battery-side microcomputer 32 performs a charge continuity confirmation process with regard to whether or not charging is allowed to be continued, based on the received contents from the microcomputer 76.

When the microcomputer 32 determines that charging should not be continued (charging should be stopped) as a result of the reception of the charge stop code, the battery-side microcomputer 32 waits for the full charge code from the charger-side microcomputer 76 and then performs the charge completion process. Meanwhile, when the microcomputer 32 determines that continuity of charging is required (charging should be continued) as a result of the reception of the charge continuity code, the charging status received together with the charge continuity code is stored in the NVRAM 64 (corresponding to an example of the storage section according to the present invention). The battery-side microcomputer 32 waits for 1 second after the start of the 8 second timer, then outputs the timer start command to the charger-side microcomputer 76 and again clears and restarts the 8 second timer to return to the process starting from the "waiting for 8 seconds" described above.

The charging status stored in the NVRAM 64 is updated at each transmission of the charging status from the charger-side microcomputer 76. The NVRAM 64 is in a state where the latest charging status is always stored.

The charger-side microcomputer 76 may be reset due to some factor during charging. If the charger-side microcomputer 76 is reset during charging, the battery-side microcomputer 32 is in the state where the response from the charger-side microcomputer 76 is not returned within 1 second after the restart of the 8 second timer in response to the output of the communication request code and the request data (charge control data) after the restart of the 8 second timer. In this case, the battery-side microcomputer 32 performs, for example, the data communication shown in FIG. 4, thereby causing the charger-side microcomputer to restart the charge control from the state immediately before resetting.

Figure 4:
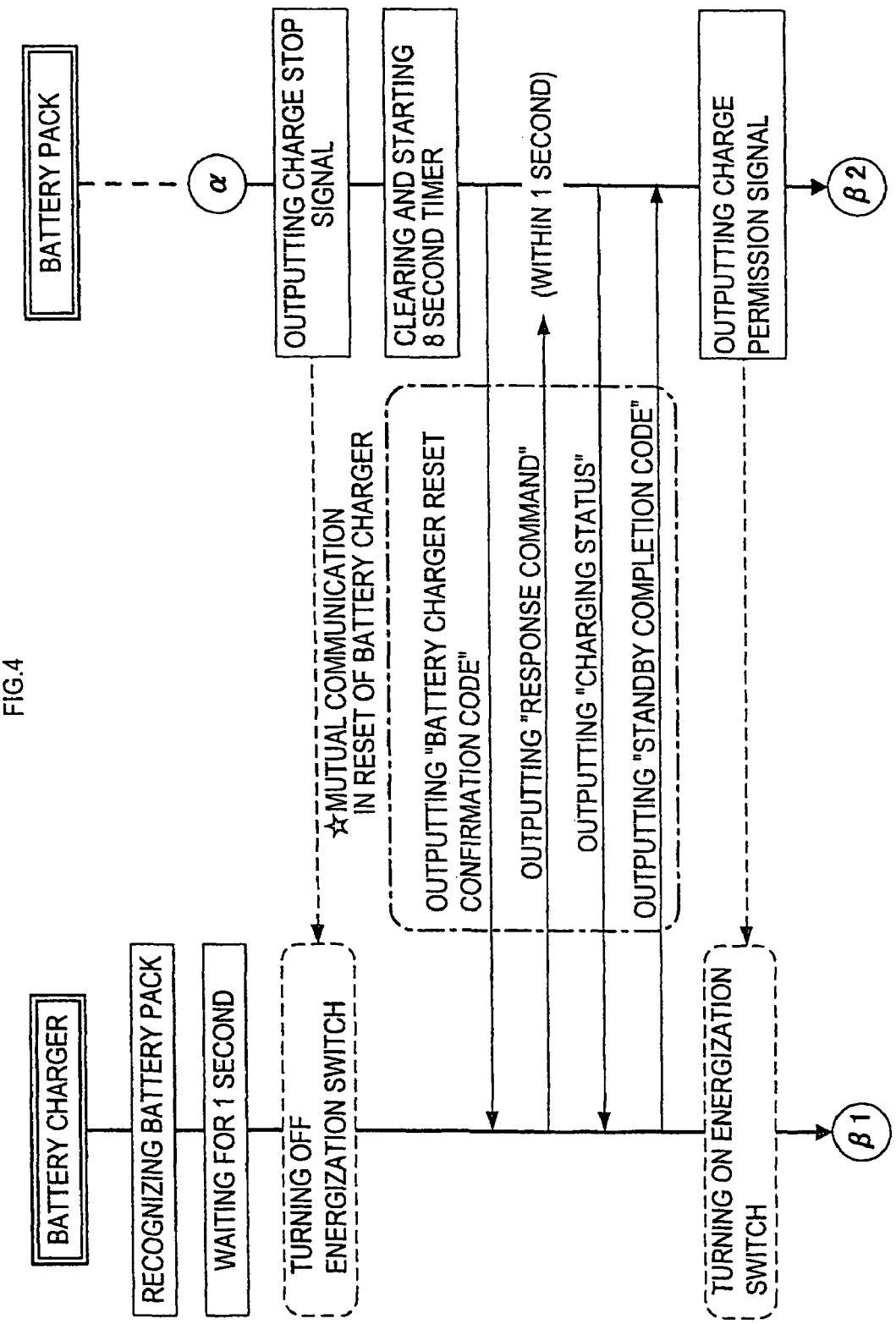
FIG. 4 is a sequence diagram shown by associating a main operation of the battery-side microcomputer with that of the charger-side microcomputer.

That is, when the battery-side microcomputer 32 has not received the desired data from the charger-side microcomputer 76 within 1 second after the restart of the second timer, the battery-side microcomputer 32 outputs the charge stop signal CS to turn off the energization switch 74 and then again clears and restarts the 8 second timer to output a charger reset confirmation code, as shown in FIG. 4.

Meanwhile, the charger-side microcomputer 76 that has been reset and then restarted recognizes again the connection of the battery pack 10 and then waits for 1 second. In this state, a charger reset confirmation code is outputted from the battery-side microcomputer 32. Therefore, upon receiving the charger reset confirmation code from the battery-side microcomputer 32 after waiting for 1 second, the charger-side microcomputer 76 outputs a response command in response to this charger reset confirmation code.

Upon receiving the response command from the charger-side microcomputer 76, the battery-side microcomputer 32 outputs the latest charging status (charging status transmitted from the charger-side microcomputer 76 immediately before resetting) stored in the NVRAM 64 to the charger-side microcomputer 76. Accordingly, the charger-side microcomputer 76 can recognize the state of the charge control, which has been performed by the charger-side microcomputer 76 itself before resetting, and the charge state before resetting can be reproduced to restart the charge control from the reproduced state.

Upon receiving the charging status from the battery-side microcomputer 32, the charger-side microcomputer 76 outputs the standby completion code to restart the charge control (to restart the process starting from clearing and starting of the 16 second timer).

Upon receiving the standby completion code from the charger-side microcomputer 76, the battery-side microcomputer 32 outputs the charge permission signal CP to again turn on the energization switch 74, and, thus, to again clear and start the 8 second timer, thereby restarting the data communication during charging (the mutual data communication starting from the output of the communication request code).

As described above, in the present embodiment, the microcomputers 32 and 76 mutually perform the above-described data communication before the start of charging, during charging, and when the battery charger 20 is reset. When the data to be normally transmitted from the microcomputer of the communication counterpart is not transmitted in response to the data transmitted by the own microcomputer, the microcomputers 32 and 76 perform the error processing for stopping charging of the rechargeable battery.

(3-2) Details of Charge Control Process

A description has been given of the summary of various processing executed by the battery-side microcomputer 32 and the charger-side microcomputer 76. However, the more specific content of the chare control process executed by the microcomputers 32 and 76 will be described with reference to FIGS. 5 to 10.

In the charger-side microcomputer 76, the CPU 91 reads a charger-side charge control processing program from the ROM 92, and a process is executed in accordance with the program. That is, in the charger-side microcomputer 76, the CPU 91 practically mainly executes the charger-side charge control process. Hereinafter, it is regarded that the charger-side microcomputer 76 including the CPU 91 and the like executes the charger-side charge control process. Also in the battery-side microcomputer 32, the CPU 61 reads a battery-side charge control processing program from the ROM 62, and a process is executed in accordance with the program. That is, in the battery-side microcomputer 32, the CPU 61 practically mainly executes the battery-side charge control process. Further, it is regarded that the battery-side microcomputer 32 constituted of the CPU 61 and the like executes the battery-side charge control process.

After activated, the battery-side microcomputer 32 monitors whether or not the battery pack 10 is mounted to the battery charger 20. When recognizing the mounting of the battery pack 10 (S505), the battery-side microcomputer 32 starts the battery-side charge control process (hereinafter referred to as a "battery-side process") which starts from S510. The battery charger 20 is recognized in S505 based on the detection signal CHD that is inputted to the port 49.

Similarly, after activated, the charger-side microcomputer 76 monitors whether or not the battery pack 10 is mounted to the battery charger 20. When recognizing the mounting of the battery pack 10 (S105), the charger-side microcomputer 76 starts the charger-side charge control process (hereinafter referred to as a "charger-side process") which starts from S110.

After the start of the battery-side process, the battery-side microcomputer 32 first executes a precharge process (various processes that should be performed before charging). That is, after the battery-side microcomputer 32 waits for 1 second in S510, it is determined in S515 whether or not the battery 31 is in a state capable of being charged. The determination in S515 as to whether or not the battery 31 can be charged is made based on, for example, a past history of abnormality stored in the NVRAM 64.

That is, when the microcomputer 32 detects the abnormality of the battery 31 by the monitor function of monitoring the state of the battery 31, the battery-side microcomputer 32 stores the abnormality history, showing that the battery 31 is a charge prohibition battery, in the NVRAM 64. Therefore, when the abnormality history is stored in the NVRAM 64 in the determination process in S515, it is determined that the battery 31 cannot be charged (S515: NO). In this case, a charge disabling command is outputted (transmitted) to the charger-side microcomputer 76 in S520, and the flow proceeds to the error processing starting from S805.

When the flow proceeds to the error processing, the battery-side microcomputer 32, in S805, first outputs the charge stop signal CS to turn off the energization switch 74 of the battery charger 20 so that the charging power is not supplied to the battery pack 10. After the timer 65 (constituting, for example, the 8 second timer) is cleared and stopped in S810, the battery-side microcomputer 32, in S815, executes such an error processing in which the abnormality history is stored in the NVRAM 64. Here, for example, the abnormality history shows that the battery 31 could not be charged due to an abnormality of the battery 31.

When it is determined that the battery 31 can be charged in the determination process in S515 (S515: YES), the battery-side microcomputer 32 outputs the communication request code to the charger-side microcomputer 76 in S525. As a specific example of the communication request code, data comprising a predetermined code can be employed.

After the output of the communication request code in S525, the battery-side microcomputer 32, in S530, waits for input (reception) of data (in this case, data indicating a request for the charge control data) that is to be outputted (transmitted) from the charger-side microcomputer 76 in response to the communication request code.

Meanwhile, after the start of the charger-side process, the charger-side microcomputer 76 also first executes the pre-charge process (various processes that should be performed before the start of charging). That is, after the charger-side microcomputer 76 waits for 1 second in S110, the charger-side microcomputer 76 waits for the input (reception) of data from the battery-side microcomputer 32 in S115. At this time, the data to be transmitted from the battery-side microcomputer 32 is assumed to be a charge disabling command (S520), the communication request code (S525), or the charger reset confirmation code (S725 of FIG. 10) to be described later.

Upon receiving the data from the battery-side microcomputer 32 (S115: YES), the charger-side microcomputer 76 first determines whether or not the received data is the charger reset confirmation code in S120. The charger reset confirmation code is outputted from the battery-side microcomputer 32 when, in the battery-side microcomputer 32, affirmative determination is made in S615 (FIG. 7), S650 (FIG. 8), and S685 (FIG. 9) after the start of charging, that is, when the desired data is not received from the charger-side microcomputer 76 within 1 second after the start of the 8 second timer (S605 in FIG. 7).

The charger-side microcomputer 76 may be reset during charging due to various factors, such as noise or instantaneous lowering of the power source Vdd. When the charger-side microcomputer 76 is reset during charging and then restarted, the data transmission and reception cannot be performed for at least 1 second after the restart of the charger-side microcomputer 76 due to the 1 second waiting processing of S110. In other words, when the charger-side microcomputer 76 is reset, the battery-side microcomputer 32 cannot receive the desired data from the charger-side microcomputer 76 for at least 1 second.

When the battery-side microcomputer 32 does not receive the desired data from the charger-side microcomputer 76 within 1 second, the charger-side microcomputer 76 may have been reset due to some factor. Therefore, the battery-side microcomputer 32 first outputs the charger reset confirmation code to confirm the reset of the charger-side microcomputer 76 rather than automatically determining the abnormality of the charger-side microcomputer 76.

In the charger-side microcomputer 76, when the received data is the charger reset confirmation code in the determination process of S120 (S120: YES), the flow proceeds to S285 of FIG. 10, and a response command is outputted (details thereof will be described later in detail). Meanwhile, when it is determined, in the determination process of S120, that the received data is not the charger reset confirmation code (S120: NO), it is determined whether or not the received data is the charge disabling command in S125.

At that time, when the charge disabling command is received (S125: YES), the flow proceeds to the error processing starting from S305. The charger-side microcomputer 76 then stops the generation and supply of the charging power in the circuit 72 to thereby stop charging of the battery 31. The timer 95 (constituting, for example, the 16 second timer) is cleared and stopped in S310. Thereafter, in S315, the charger-side microcomputer 76 executes such an error processing that the abnormality history, showing that the battery 31 could not be charged due to an abnormality of the battery 31, is stored in the NVRAM 94.

Figure 6:
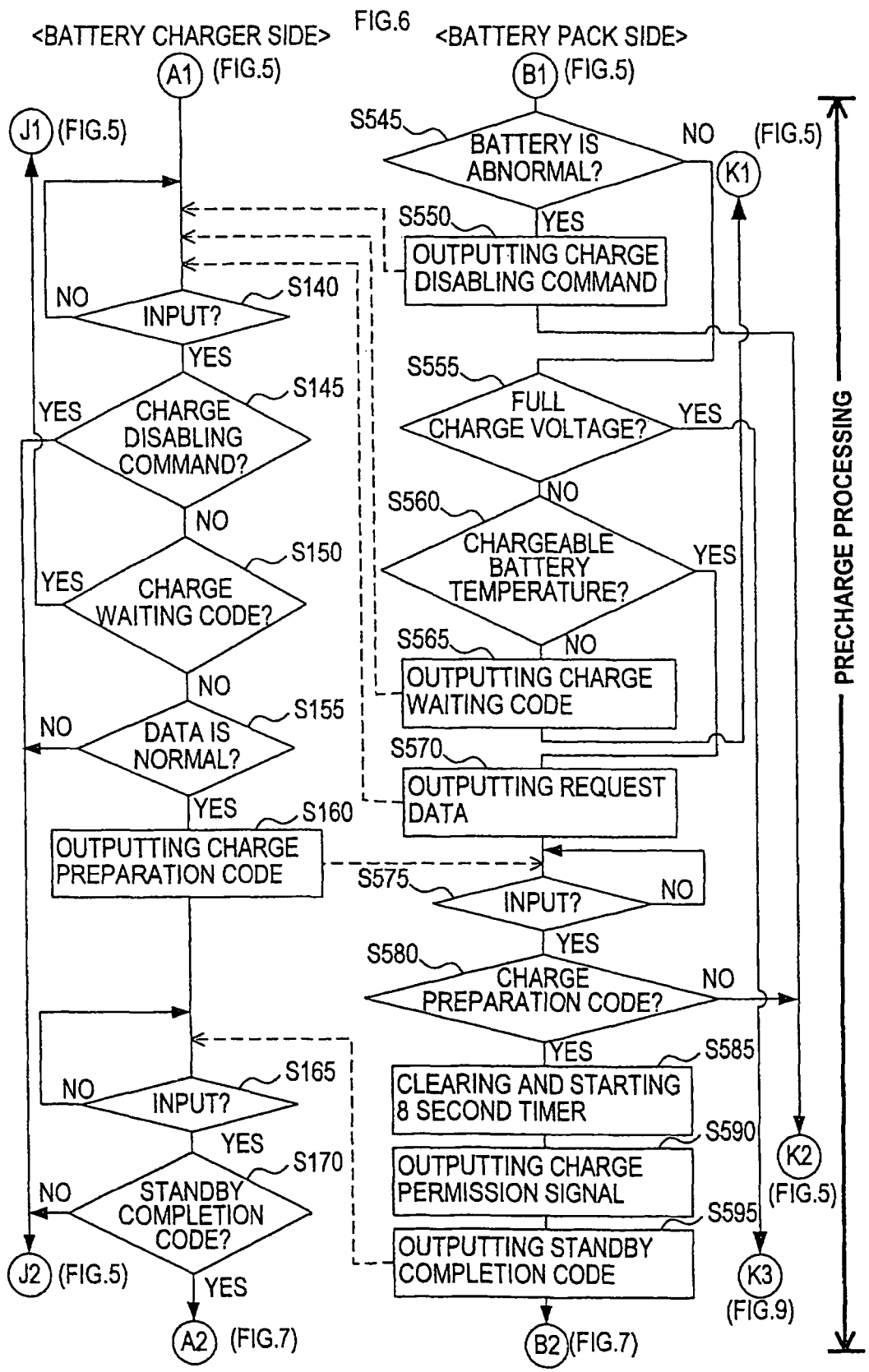
FIG. 6 is a flow chart representing the battery-side charge control process executed by the battery-side microcomputer and the charger-side charge control process executed by the charger-side microcomputer.

When it is determined, in the determination process of S125, that the received data is not the charge disabling command (S125: NO), it is further determined whether or not the received data is the communication request code in S130. When it is determined that the received data is not the communication request code (S130: NO) either, any abnormality may have occurred in the battery-side microcomputer 32, and therefore, the flow proceeds to the error processing starting from S305. Meanwhile, when it is determined that the received data is communication request code (S130: YES), the charge control data is requested to the battery-side microcomputer 32 in S135. The charger-side microcomputer 76 waits for input of data to be transmitted from the battery-side microcomputer 32 in response to the request for the charge control data in S140 (FIG. 6).

The charge control data requested in S135 is necessary for the charger-side microcomputer 76 to start the charge control. The charge control data includes information of the battery 31 itself (for example, how much voltage the battery 31 has), a charging capacity of the battery, the maximum charging current that can be applied in the charging, and a past charging history (for example, the number of charging made before).

That is, the battery charger 20 of the present embodiment is not an exclusive battery charger corresponding to only the battery pack 10, but can charge various types of battery packs having different voltages and charging capacities. The charger-side microcomputer 76 determines the type of the battery pack mounted thereto based on the charge control data transmitted from the battery pack in response to the request made in S135 and executes a proper charge control corresponding to the battery pack.

Meanwhile, when any data is inputted after the output of the communication request code in S525 (S530: YES), the battery-side microcomputer 32 determines whether or not the received data is a data request command (that is, data indicating the request for the charge control data) from the charger-side microcomputer 76 (S535). When the received data is not the request for the charge control data (S535: NO), any abnormality may have occurred in the charger-side microcomputer 76, and therefore, the flow proceeds to the error processing starting from S805. On the other hand, when the received data is the request for the charge control data (S535: YES), the status (state) of the battery 31 is checked in S540.

The status check of the battery 31 includes a check of an over-discharge state of the battery 31, a check of the voltages (cell voltage) of the battery cells B1, B2, . . . , and Bn and the battery voltage Vbat, and a check of the temperature of the battery 31.

The over-discharge state of the battery 31 is checked based on the detection signal LV.

The voltages (cell voltage) of the battery cells B1, B2, . . . , and Bn and the battery voltage Vbat are checked based on the cell voltage signal CeV.

The temperature of the battery 31 is checked based on the cell temperature signal CeT.

Based on the result of the status check performed in S540, the battery-side microcomputer 32 then determines whether or not the battery 31 is abnormal in S545 (FIG. 6). When it is determined that the battery 31 is in such an abnormal state where the battery 31 should not be charged, for example, because the battery 31 is in the over-discharge state (S545: YES), the charge disabling command is outputted in S550, and the flow proceeds to the error processing (FIG. 5) starting from S805.

When it is determined, in the determination process in S545, that there is no abnormality in the battery 31 (S545: NO), it is determined in S555 whether or not the battery 31 is in the full charge state, that is, whether or not the battery voltage Vbat is a predetermined full charge voltage. When the battery 31 is already in the full charge state (S555: YES), the battery 31 is not required to be charged. Therefore, the flow proceeds to the process starting from S700 in the charge completion process of FIG. 9.

That is, the battery-side microcomputer 32 outputs the charge stop signal CS in S700 to thereby turn off the energization switch 74 of the battery charger 20. The timer 65 is then cleared and stopped in S705, and thereafter, various charge completion processes including monitoring of the removal of the battery pack 10 from the battery charger 20 are executed in S710. When the removal of the battery pack 10 from the battery charger 20 is detected, the battery-side charge control process is terminated.

Thereafter, when the battery pack 10 is mounted to the battery charger 20 again, and the mounting of the battery pack 10 is detected by the battery-side microcomputer 32 (S505 of FIG. 5), the battery-side charge control process is executed again.

When it is determined, in the determination process of S555, that the battery voltage Vbat does not reach the full charge voltage and thus the battery 31 is not in the full charge state (S555: NO), the battery-side microcomputer 32 determines whether or not the temperature of the battery 31 is in a chargeable temperature range in S560. When it is determined that the temperature of the battery 31 is not in the chargeable temperature range (S560: NO), a charge waiting code is outputted in S565 in order to charge the battery 31 after the temperature of the battery 31 is lowered to be within the chargeable temperature range. The flow then returns to S530 (FIG. 5), and the battery-side microcomputer 32 again waits for the request for the charge control data from the charger-side microcomputer 76 (S135 of FIG. 5).

When the temperature of the battery 31 is within the chargeable temperature range (S560: YES), the charge control data requested by the charger-side microcomputer 76 in S135 (FIG. 5) is outputted in S570. After the output of the charge control data, the battery-side microcomputer 32 waits for the reception of the charge preparation code from the charger-side microcomputer 76 (S160) in S575.

Figure 5:
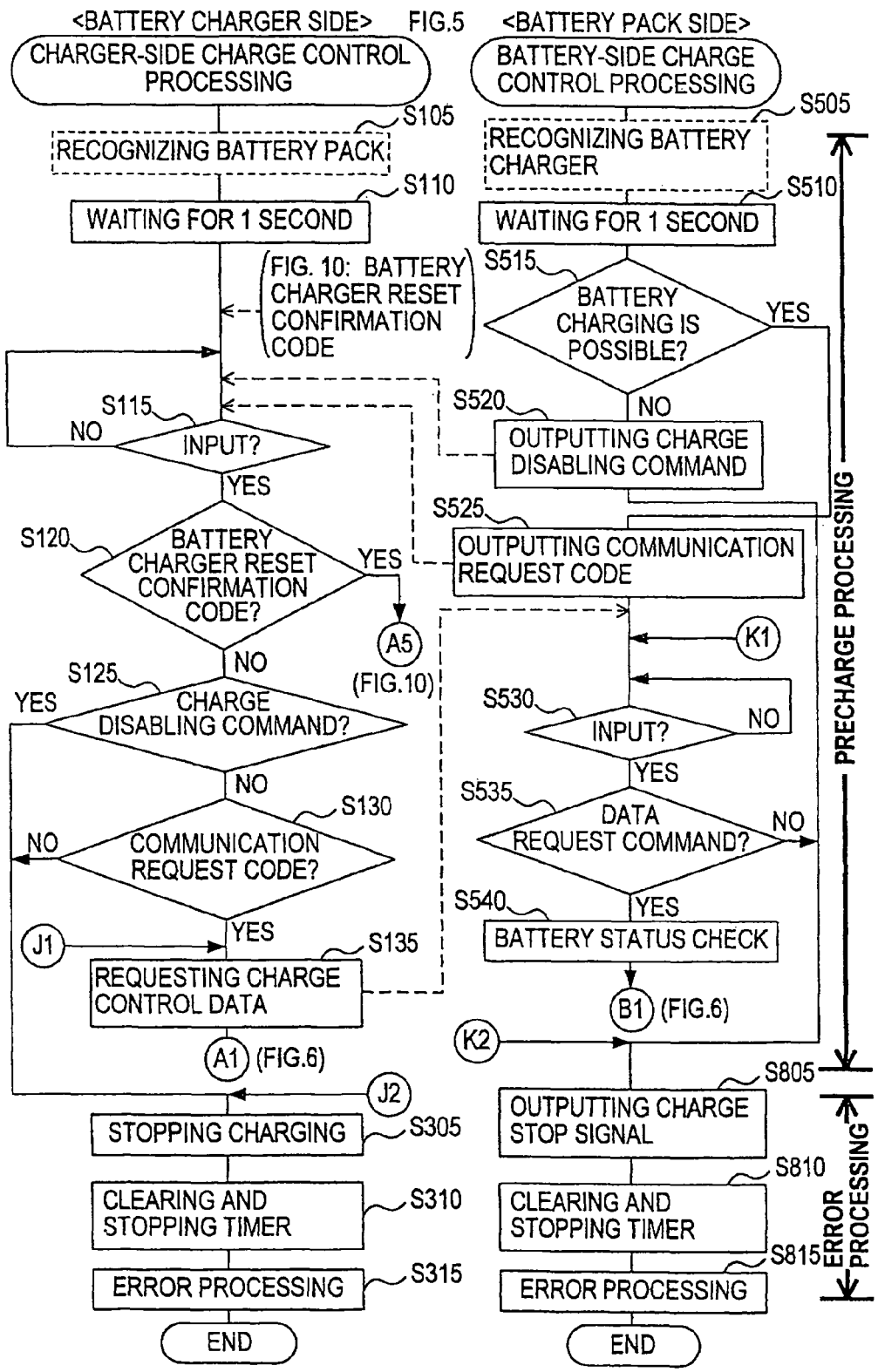
FIG. 5 is a flow chart representing a battery-side charge control process executed by the battery-side microcomputer and a charger-side charge control process executed by the charger-side microcomputer.

Meanwhile, after the request for the charge control data of S135 (FIG. 5), the charger-side microcomputer 76 waits for the data input from the battery-side microcomputer 32. When any data is inputted (S140: YES), whether or not the inputted data is the charge disabling command (S550) is determined in S145. At this time, when the inputted data is the charge disabling command (S145: YES), the flow proceeds to the error processing starting from S305 (FIG. 5). On the other hand, when the inputted data is not the charge disabling command (S145: NO), it is determined whether or not the inputted data is the charge waiting code (S565) in the subsequent S150. At this time, when the inputted data is the charge waiting code (S150: YES), the flow returns to S135 (FIG. 5) again, where the charge control data is requested. When the inputted data is not the charge waiting code (S150: NO), it is determined in the subsequent S155 whether or not the inputted data is normal, that is, whether or not the charge control data requested in S135 is normally inputted.

At that time, when the requested charge control data is not normally inputted (S155: NO), any abnormality may have occurred in the battery-side microcomputer 32, and therefore, the flow proceeds to the error processing starting from S305 (FIG. 5). On the other hand, when the charge control data is normally inputted (S155: YES), the charge preparation code is outputted in S160. The charge preparation code indicates that a preparation for executing charging is completed in the charger-side microcomputer 76.

After the output of the charge preparation code, the charger-side microcomputer 76, in S165, waits for the input of the standby completion code (S595) that is data to be transmitted from the battery-side microcomputer 32 in response to the charge preparation code. When any data is received (S165: YES), whether or not the received data is the standby completion code is determined in S170. When the received data is not the standby completion code (S170: NO), any abnormality may have occurred in the battery-side microcomputer 32, and therefore, the flow proceeds to the error processing starting from S305 (FIG. 5). On the other hand, when the received data is the standby completion code (S170: YES), the precharge process is terminated, and the flow proceeds to the process during charging of FIG. 7 (the process starting from S175).

Meanwhile, after the output of the request data (charge control data) of S570, the battery-side microcomputer 32 waits for data input from the charger-side microcomputer 76. When any data is inputted (S575: YES), whether or not the inputted data is the charge preparation code (S160) is determined in S580. At this time, when the inputted data is not the charge preparation code (S580: NO), any abnormality may have occurred in the charger-side microcomputer 76, and therefore, the flow proceeds to the error processing starting from S805 (FIG. 5). On the other hand, when the inputted data is the charge preparation code (S580: YES), the 8 second timer is temporarily cleared and then started in the subsequent S585. That is, the battery-side microcomputer 32 waits for 8 seconds with the use of the timer 65.

The charge permission signal CP is outputted in S590 to thereby turn on the energization switch 74 of the battery charger 20. Further, the standby completion code is outputted to the charger-side microcomputer 76 in S595, and the precharge process is terminated. The flow then proceeds to the process during charging of FIG. 7 (the process starting from S600).

At first, in S175, the charger-side microcomputer 76 once clears the 16 second timer (the timer 95) and then starts the 16 second timer. Charging is started in S180. That is, the circuit 72 is controlled to start the supply of the charging power to the battery pack 10, and further to start the charging of the battery 31.

Until it is determined that 16 seconds have elapsed after the start of the 16 second timer (S175) in S185 after the start of charging of S180, the charger-side microcomputer 76 waits for the input of the communication request code (S610) from the battery-side microcomputer 32 in S190.

In S600, the battery-side microcomputer 32 waits for 8 seconds after the start of the 8 second timer of S585 (FIG. 6). The 8 seconds correspond to an example of a specified time in the present invention, and the battery 31 is charged by the battery charger 20 during this period. When 8 seconds have elapsed (S600: YES), the 8 second timer is cleared again and restarted in S605. The communication request code is outputted to the charger-side microcomputer 76 in S610.

In the charger-side microcomputer 76, when after the start of charging of S180, any data is inputted for 16 seconds from the start of the 16 second timer (S185: N0, S190: YES), it is determined in S195 whether or not the received data is the communication request code (S610) from the battery-side microcomputer 32. When the received data is not the communication request code (S195: NO), any abnormality may have occurred in the battery-side microcomputer 32, and therefore, the flow proceeds to the error processing starting from S305 (FIG. 5). Meanwhile, when the received data is the communication request code (S195: YES), charging is suspended in S200, and then the charge control data is requested to the battery-side microcomputer 32 in S205. The requested charge control data is slightly different from the charge control data requested in S135 (FIG. 5) before the start of charging. Specifically, the charge control data requested in S205 mainly shows the present state of the battery 31 such as the present battery voltage Vbat and the present battery temperature.

Until it is determined that 16 seconds have elapsed from the start of the 16 second timer (S175) in S210 after the request for the charge control data in S205, the charger-side microcomputer 76 waits for the input of the request data from the battery-side microcomputer 32 (S645) in S215.

Meanwhile, after the output of the communication request code in S610, the battery-side microcomputer 32 waits for the request for the charge control data from the charger-side microcomputer 76 (S205) in S620 on condition that the elapsed time after the restart of the 8 second timer (S605) is less than 1 second (S615). When 1 second has elapsed after the restart of the 8 second timer without data input (S615), the flow proceeds to a recharge permission process of FIG. 10 (the process starting from S715). Meanwhile, when any data is inputted for 1 second after the restart of the 8 second timer (S615: NO, S620: YES), it is determined in S625 whether or not the received data is a request command of the charge control data from the charger-side microcomputer 76 (S205). When the received data is not the request command of the charge control data (S625: NO), any abnormality may have occurred in the charger-side microcomputer 76, and therefore, the flow proceeds to the error processing starting from S805 (FIG. 5). On the other hand, when the received data is the request command of the charge control data (S625: YES), the status (state) of the battery 31 is checked in S630. This checking is the same as the battery status check of S540 in FIG. 5.

Based on the result of the battery status check in S630, the battery-side microcomputer 32 determines whether or not the battery 31 is normal in S635. When it is determined that the battery 31 is in such an abnormal state where the battery 31 should not be charged, for example, because the battery 31 is in the over-discharge state (S635: NO), the charge disabling command is outputted in S640, and the flow proceeds to the error processing starting from S805 (FIG. 5).

When it is determined, in the determination process of S635, that the battery 31 is normal (S635: YES), the charge control data requested by the charger-side microcomputer 76 (S205) is outputted in S645. After the output of the charge control data, the battery-side microcomputer 32 waits for the code input from the charger-side microcomputer 76 in S655 on condition that the elapsed time after the restart of the 8 second timer (S605) is within 1 second (S650 in FIG. 8).

Meanwhile, when any data is inputted from the battery-side microcomputer 32 until it is determined in S210 that 16 seconds have elapsed (S215: YES), the charger-side microcomputer 76 determines whether or not the inputted data is the charge disabling command (S640 in FIG. 7) in S220 (FIG. 8). When it is determined in S210 that 16 seconds have elapsed, any abnormality may have occurred in the battery-side microcomputer 32, and therefore, the flow proceeds to the error processing starting from S305 (FIG. 5).

When the inputted data is the charge disabling command (S220: YES), any abnormality may have occurred in the battery-side microcomputer 32, and therefore, the flow proceeds to the error processing starting from S305 (FIG. 5). Meanwhile, when the inputted data is not the charge disabling command (S220: NO), it is determined whether or not the inputted data is normal, that is, whether or not the charge control data requested in S205 is normally inputted is determined in the subsequent S225.

At that time, when the requested charge control data is not normally inputted (S225: NO), the flow proceeds to the error processing starting from S305 (FIG. 5). On the other hand, when the charge control data is normally inputted (S225: YES), it is determined (charge continuity confirmation) in S230 whether or not charging is allowed to be continued, based on the inputted charge control data.

When it is determined that charging is allowed to be continued (S230: YES), the charge continuity code and the charging status are transmitted in S240. Thereafter, until it is determined that 16 seconds have elapsed after the start of the 16 second timer (S175) in S245, the charger-side microcomputer 76 waits for the input of the timer start command from the battery-side microcomputer 32 (S675) in S250. When it is determined that 16 seconds have elapsed in S245, any abnormality may have occurred in the battery-side microcomputer 32, and therefore, the flow proceeds to the error processing starting from S305 (FIG. 5).

Figure 9:
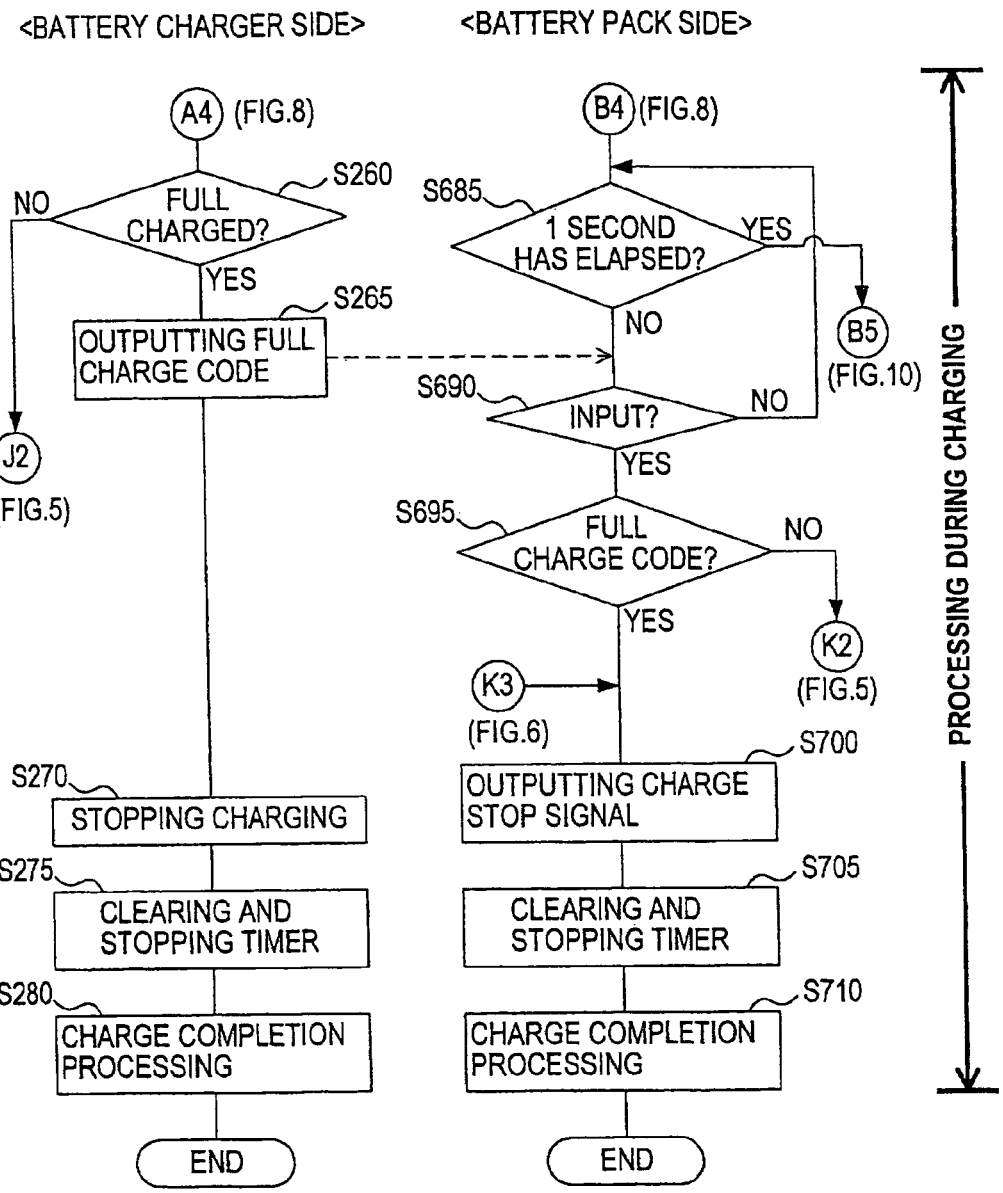
FIG. 9 is a flow chart representing the battery-side charge control process executed by the battery-side microcomputer and the charger-side charge control process executed by the charger-side microcomputer.

When it is determined in S230 that charging should not be continued, the charge stop code is outputted in S235, the flow proceeds to the charge completion process of FIG. 9 (the process starting from S260).

Meanwhile, when after the output of the request data of S645 (FIG. 7), any data is inputted from the charger-side microcomputer 76 within 1 second after the restart of the 8 second timer (S605) (S655: YES), the battery-side microcomputer 32 determines in S660 whether or not the inputted data is the charge continuity code. When the inputted data is not the charge continuity code (S660: NO), the flow proceeds to the charge completion process of FIG. 9 (the process starting from S685). Meanwhile, the inputted data is the charge continuity code (S660: YES), the charge continuity code and the charging status transmitted together from the charger-side microcomputer 76 are stored in the NVRAM 64 in S665. After 1 second has elapsed after the restart of the 8 second timer (S605) (S670: YES), the timer start command is outputted in S675.

In contrast, when after the output of the charge continuity code and the charging status in S240, any data is inputted from the battery-side microcomputer 32 within 16 seconds (S250: YES), the charger-side microcomputer 76 determines in S255 whether or not the inputted data is the timer start command. When the inputted data is not the timer start command (S255: NO), any abnormality may have occurred in the battery-side microcomputer 32, and therefore, the flow proceeds to the error processing starting from S305 (FIG. 5).

Meanwhile, when the inputted data is the timer start command (S255: YES), the flow returns to S175 (FIG. 7), and the process starting from S175 is executed. That is, the 16 second timer is cleared again and restarted (S175), and charging is started (restarted) (S180).

Also in the battery-side microcomputer 32, the 8 second timer is cleared again and restarted in S680 after the timer start command is outputted in S675.

Thereafter, the flow returns to S600 (FIG. 7) again, and the process starting from S600 is executed.

That is, the timer start command outputted from the battery-side microcomputer 32 in S675 is issued for synchronizing between the timer (the 8 second tinier) 65 in the battery-side microcomputer 32 and the timer (the 16 second timer) 95 in the charger-side microcomputer 76. When the battery-side microcomputer 32 outputs the timer start command, the 8 second timer in the battery-side microcomputer 32 and the 16 second timer in the charger-side microcomputer 76 are substantially simultaneously restarted (S680 of FIG. 8 and S175 of FIG. 7, respectively). According to this configuration, the starting of charging in S180 in the charger-side microcomputer 76 and the waiting for 8 seconds of S600 in the battery-side microcomputer 32 are substantially simultaneously restarted.

Next, a series of the charge completion process shown in FIG. 9 will be described. After the charger-side microcomputer 76 outputs the charge stop code in S235 (FIG. 8), the flow moves to the charge completion process in FIG. 9. First, it is determined whether or not the battery 31 is in the full charge state in S260. When the battery 31 is not yet in the full charge state (S260: NO), the flow proceeds to the error processing starting from S305 (FIG. 5). When, despite being determined that charging should not be continued in S230 (FIG. 8), the battery 31 is not yet in the full charge state, it is predicted that the battery 31 is in any abnormal state where the battery 31 should not be continued to be charged. Therefore, when it is determined that the battery 31 is not in the full charge state in S260, the error processing is executed.

When it is determined that the battery 31 is in the full charge state in S260 (S260: YES), the full charge code is outputted to the battery-side microcomputer 32 in S265. Thereafter, in S270, the generation and supply of the charging power in the circuit 72 are stopped, whereby charging of the battery 31 is stopped. Then, the timer 95 (the 16 second timer) is cleared and stopped in the subsequent S275, and thereafter, various charge completion processes are executed in S280. For example, the process for monitoring the removal of the battery pack 10 from the battery charger 20 is executed. When the removal of the battery pack 10 from the battery charger 20 is detected, the charger-side charge control process is terminated.

Meanwhile, when any data is inputted from the charger-side microcomputer 76 within 1 second after the restart of the 8 second timer in S605 (FIG. 7) (S690: YES), the battery-side microcomputer 32 determines in S695 whether or not the inputted data is the full charge code (S265). When the inputted data is not the full charge code (S695: NO), any abnormality may have occurred in the charger-side microcomputer 76, and therefore, the flow proceeds to the error processing starting from S805 (FIG. 5). Meanwhile, when the inputted data is the full charge code (S695: YES), the above-described process starting from S700 is performed, and the battery-side charge control process is terminated.

Figure 10:
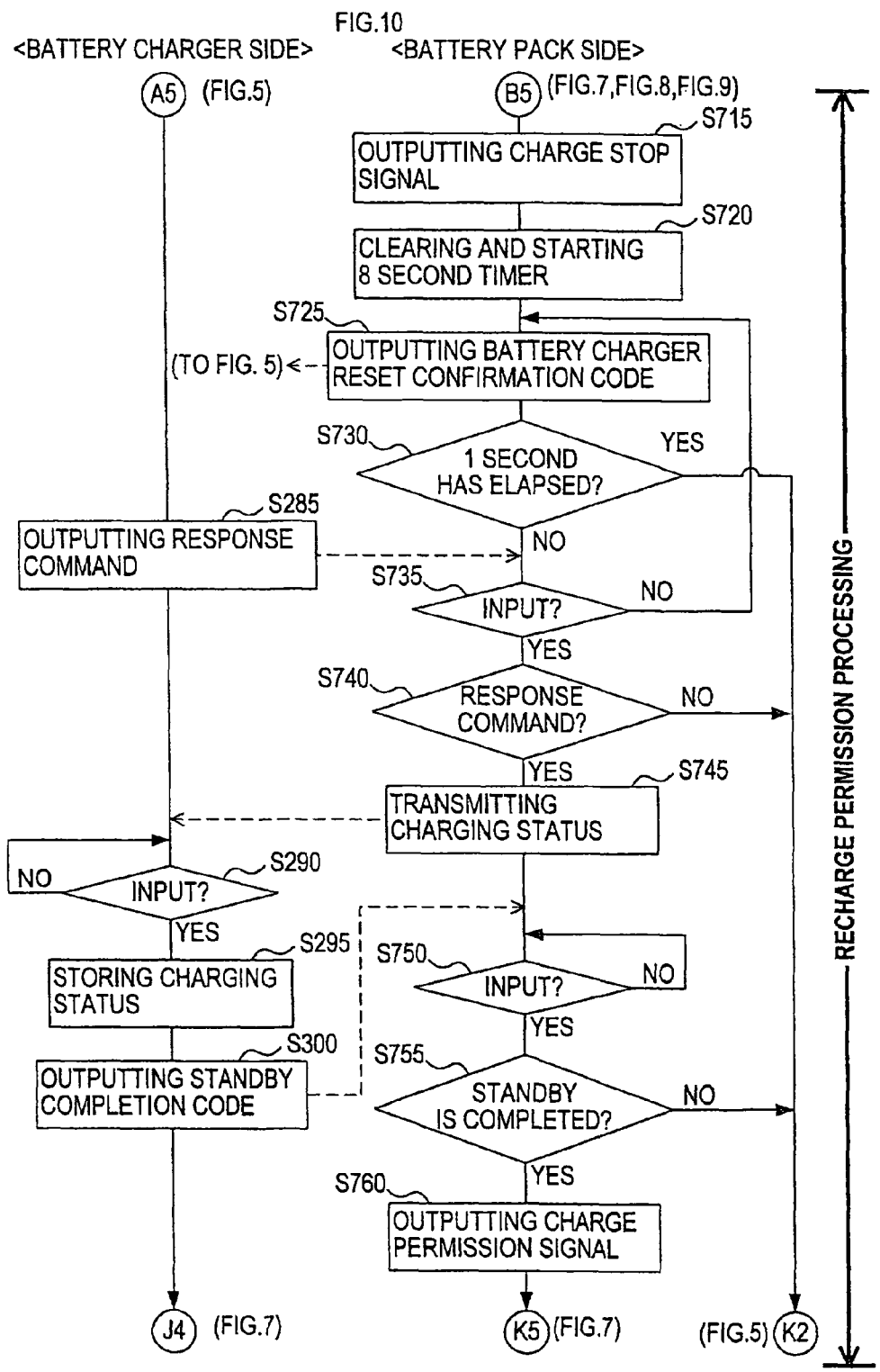
FIG. 10 is a flow chart representing the battery-side charge control process executed by the battery-side microcomputer and the charger-side charge control process executed by the charger-side microcomputer.

Next, a series of the recharge permission process shown in FIG. 10 will be described. When, in the determination processes of S615 (FIG. 7), S650 (FIG. 8), and S685 (FIG. 9) after the start of charging, the battery-side microcomputer 32 does not receive the desired data from the charger-side microcomputer 76 within 1 second after the start of the 8 second timer (S605 of FIG. 7), the charger-side microcomputer 76 may have been reset due to any factor, and therefore, the flow moves to the recharge permission process of FIG. 10. That is, the charge stop signal CS is first outputted in S715, whereby the energization switch 74 of the battery charger 20 is turned off. Next, the 8 second timer is cleared again and restarted in S720. Then, the charger reset confirmation code is outputted to the charger-side microcomputer 76 in the subsequent S725.

Meanwhile, if the charger-side microcomputer 76 was reset during charging, the charger-side charge control process is executed after resetting, and thereafter, the charger reset confirmation code should be received from the battery-side microcomputer 32 in S120 (FIG. 5). When the charger-side microcomputer 76 receives the charger reset confirmation code (S120: YES), the flows moves to the recharge permission process in FIG. 10, and the response command for the charger reset confirmation code is first outputted in S285.

After the output of the charger reset confirmation code in S725, the battery-side microcomputer 32 waits for the input of any data from the charger-side microcomputer 76 for 1 second. When any data is not inputted within 1 second (S730: YES), the flow proceeds to the error processing starting from S305 (FIG. 5). Meanwhile, when any data is inputted within 1 second (S735: YES), whether or not the inputted data is the response command (S285) is determined in S740. When the inputted data is the response command (S740: YES), the charging status stored in the NVRAM 65 is transmitted in S745. The battery-side microcomputer 32 waits for the input of the standby completion code that is to be outputted from the charger-side microcomputer 76 in response to the charging status.

Meanwhile, when after the output of the response command in S285, the charger-side microcomputer 76 receives the charging status from the battery-side microcomputer 32 (S290: YES), the inputted charging status is stored in the NVRAM 95 in S295. According to this configuration, the charger-side microcomputer 76 can recognize its own control state immediately before resetting, and the charge control can be restarted from the control state immediately before resetting. The standby completion code is then outputted to the battery-side microcomputer 32 in the subsequent S300, and the flow moves to the process during charging in FIG. 7 (the process starting from S175).

When after the transmission of the charging status in S745, the battery-side microcomputer 32 receives any data from the charger-side microcomputer 76 (S750: YES), and if the received data is the standby completion code (S755: YES), the charge permission signal CP is outputted, whereby the energization switch 74 of the battery charger 20 is turned on again, and the flow moves to the process during charging in FIG. 7 (in this case, the process starting from S605).

Figure 7:
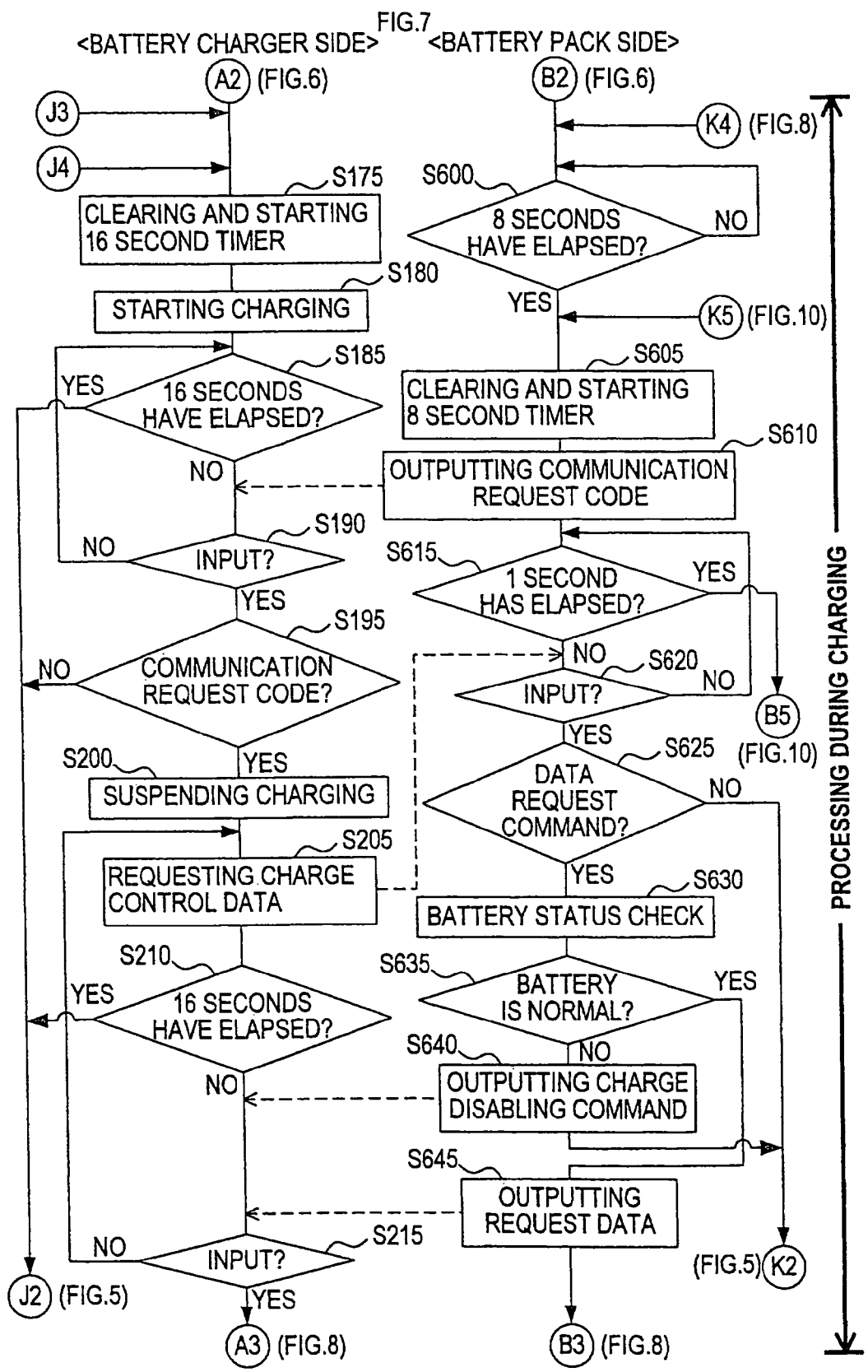
FIG. 7 is a flow chart representing the battery-side charge control process executed by the battery-side microcomputer and the charger-side charge control process executed by the charger-side microcomputer.
Figure 8:
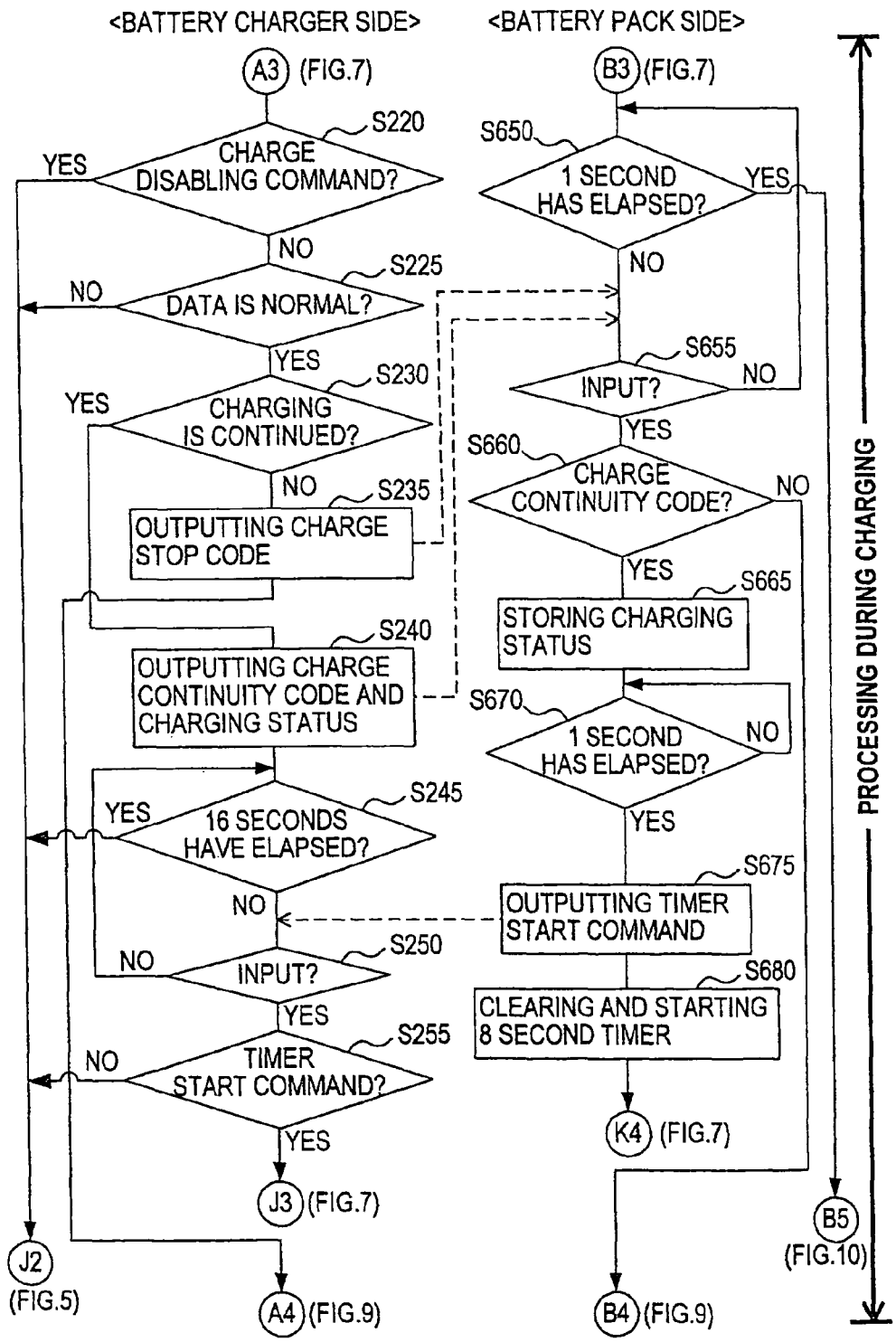
FIG. 8 is a flow chart representing the battery-side charge control process executed by the battery-side microcomputer and the charger-side charge control process executed by the charger-side microcomputer.

In the process during charging in FIG. 7, it is configured such that, charging is first suspended in S200 when the charger-side microcomputer 76 starts the data communication with the battery-side microcomputer 32 by receiving the communication request code from the battery-side microcomputer 32 (S610). This is based on the following reasons.

That is, in the battery charger 20 of the present embodiment, the circuit 72 that generates the charging power is literally configured by a switching power circuit. As is well known, since the switching power circuit repeats on/off operation of a semiconductor switching element to thereby control the generated current and voltage, switching noise occurs during the operation of the switching power circuit.

Therefore, when the data communication is performed between the charger-side microcomputer 76 and the battery-side microcomputer 32 during charging, the switching noise may adversely affect the data communication. Therefore, in the present embodiment, when the data communication is performed during charging, the charger-side microcomputer 76 suspends charging, thereby eliminating concerns attributed to the switching noise. Thus the quality of the data communication is secured.

Therefore, if the battery charger 20 generates the charging power not by the switching power circuit but by a circuit with less occurrence of noise, charging does not necessarily need to be suspended. Also in the present embodiment, charging does not necessarily need to be suspended. For example, in the case where the noise level is low, or any measure (for example, application of a shield) for reducing the influence of the noise is taken, and, consequently, when the level of the influence on the data communication will not cause any particular problems, the data communication may be performed while charging is continued.

(4) Effects of First Embodiment

As described above, the charging system 30 of the present embodiment is configured such that, when the battery pack 10 is mounted on the battery charger 20 (specifically when the charger-side microcomputer 76 and the battery-side microcomputer 32 respectively recognize the mounting of the battery pack 10 on the battery charger 20), the charger-side microcomputer 76 and the battery-side microcomputer 32 mutually perform data commutation before the start of charging, and perform the mutual operation confirmation for confirming the operational state of the microcomputer of the communication counterpart based on the data communication result. When it is confirmed that the microcomputers 32 and 76 are normal as a result of the mutual operation confirmation, the charger-side microcomputer 76 starts the charging of the battery pack 10.

During charging, the data communication between the microcomputers 32 and 76 and the mutual operation confirmation based on the data communication are performed at every specified predetermined time (8 seconds in the present embodiment). When an abnormality is detected from any one of the microcomputers, the microcomputer having detected the abnormality executes a predetermined charge stop process (the error processing) for stopping charging.

Thus, according to the charging system 30 of the present embodiment, when one microcomputer detects an abnormality in the other microcomputer as a result of the mutual operation confirmation, the microcomputer having detected the abnormality executes the error processing (see, FIG. 5) to stop charging of the battery 31. Therefore, the battery 31 of the battery pack 10 can be inhibited from being adversely affected due to the abnormality of the microcomputer.

As a method for monitoring the operation of the microcomputer, a method for monitoring using a watchdog timer is generally well known. On the other hand, the mutual operation confirmation in the charging system 30 of the present embodiment is not simple compared with the method for monitoring using a watchdog timer. In the present embodiment, the microcomputers 32 and 76 mutually perform the data communication, and it is determined whether or not the microcomputer of the communication counterpart is normal based on the contents of the received data (such as code). Further, the normality of the microcomputer of the communication counterpart is determined also by whether or not the desired data can be received within a predetermined time. Furthermore, in the well-known method for monitoring using a watchdog timer, when an abnormality of the microcomputer is detected, the microcomputer is generally reset. In contrast, in the present embodiment, when one microcomputer detects an abnormality of the other microcomputer of the communication counterpart, the microcomputer having detected the abnormality executes the charge stop process for stopping charging.

Therefore, according to the charging system 30 of the present embodiment, compared with the conventional method for monitoring typified by the method for monitoring using a watchdog timer, the abnormality of the microcomputer can be determined with higher accuracy. When the abnormality is detected, a more appropriate action can be provided.

The mutual operation confirmation during charging is repeated at every specified time (in the present embodiment, at every 8 seconds as specified in S600). Therefore, when an abnormality occurs in any one of the microcomputers during charging, the abnormality can be quickly detected, and charging can be stopped.

In addition, in the present embodiment, the mutual operation confirmation can be performed before the start of charging. When an abnormality is not detected in the respective microcomputers as a result of the mutual operation confirmation, the charger-side microcomputer 76 performs the charge control of the battery 31 (control of the circuit 72). According to this configuration, when an abnormality is detected from any one of the microcomputers as a result of the mutual operation confirmation before the start of charging, the charging of the battery 31 is not started. Therefore, an adverse effect on the battery 31 due to the abnormality of the microcomputer can be more reliably and satisfactorily inhibited.

The mutual operation confirmation performed by the microcomputers 32 and 76 is started mainly by the transmission of the communication request code from the battery-side microcomputer 32. Then, the charger-side microcomputer 76 responses to the transmission of the communication request code (requests the charge control data). Further, in response to the request from the charger-side microcomputer 76, the battery-side microcomputer 32 outputs the requested charge control data. In addition to the above, the respective microcomputers appropriately perform the mutual operation confirmation based on the contents of the data received from the microcomputer of the communication counterpart or based on whether or not the requested data could be received within a fixed time.

Therefore, when an abnormality occurs in the microcomputer of the communication counterpart, the respective microcomputers can more reliably, efficiently, and quickly detect the abnormality.

Moreover, the mutual operation confirmation is started first by the transmission of the communication request code from the battery-side microcomputer 32. Therefore, even if an abnormality occurs in the charger-side microcomputer 76, the battery-side microcomputer 32 can reliably detect the abnormality to stop charging.

Furthermore, the data communication for the mutual operation confirmation is not performed only for the confirmation of the operational state of the microcomputer of the communication counterpart, but the information required for charging is transmitted and received. That is, while the microcomputers mutually transmit and receive the information required for charging through the data communication, the microcomputers perform the mutual operation confirmation based on the result of the data communication. Therefore, while the two microcomputers monitor each other, the charging of the battery 31 is suitably controlled by the charger-side microcomputer 76.

When the charger-side microcomputer 76 is reset during charging, the charger-side microcomputer 76 obtains from the battery-side microcomputer 32 the charging status immediately before resetting and can restart the charge control from the state immediately before resetting based on the charging status received.

It is configured such that, when the mutual operation confirmation is performed between the respective microcomputers during charging, the charger-side microcomputer 76 suspends charging. Therefore, the influence of the noise (such as switching noise) attributed to the operation of the circuit 72 can be eliminated at least during execution of the mutual operation confirmation, and the mutual operation confirmation can be performed with high accuracy.

[Second Embodiment]

Next, a charging system of the second embodiment will be described with reference to FIG. 11.

The charging system of the second embodiment and the charging system 30 of the first embodiment shown in FIGS. 1 and 2 are partially different in terms of the hardware for performing the data communication between the respective microcomputers. Except for this point, the data communication and the mutual operation confirmation performed between the respective microcomputers 32 and 76 and the overall functions of the microcomputers 32 and 76 of the second embodiment are the same as those of the first embodiment.

Figure 11:
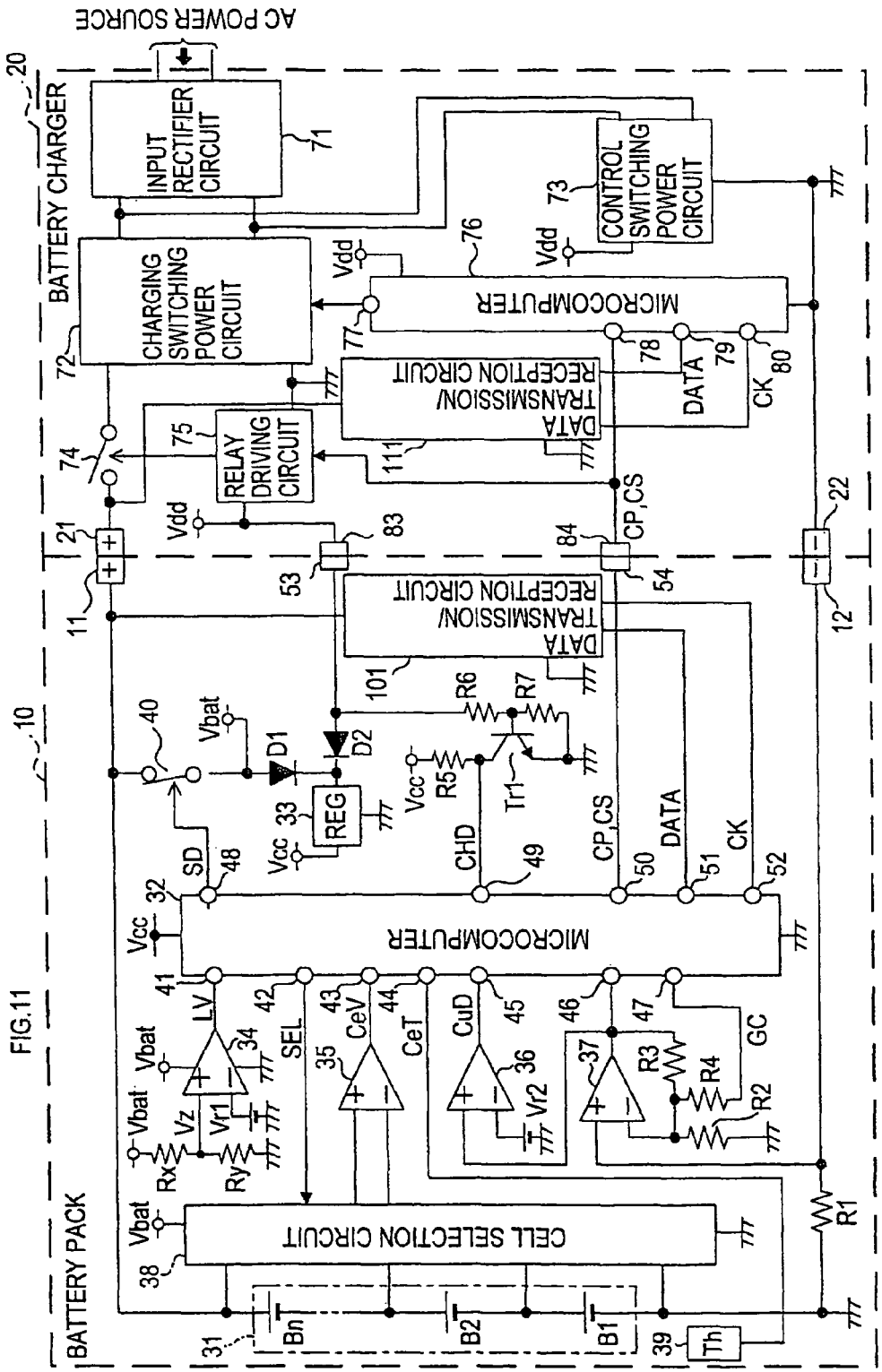
FIG. 11 is an electric circuit diagram showing an electrical configuration of the charging system of a second embodiment.

As can be seen by comparing FIG. 2 and FIG. 11, in the charging system of the second embodiment, the battery pack 10 does not include the data input/output terminal 55 for data communication and the clock input terminal 56. In the present embodiment, the battery-side microcomputer 32 performs the data communication with the charger-side microcomputer 76 by using not the exclusive terminal in the first embodiment (the data input/output terminal 55 and the clock input terminal 56) but the positive terminal 11 (corresponding to an example of the power receiving terminal in the present invention) which is a terminal for inputting a charging power. Therefore, the battery pack 10 includes a data transmission/reception circuit 101 for data communication performed through the positive terminal 11. The battery-side microcomputer 32 performs the data communication through the circuit 101 and the terminal 11.

Similarly, in the battery charger 20, the charger-side microcomputer 76 performs the data communication with the battery-side microcomputer 32 by using not the exclusive terminal of the first embodiment (the terminals 85 and 86) but the positive terminal 21 (corresponding to an example of the power supply terminal in the present invention) which is a terminal for supplying a charging power. Therefore, the battery charger 20 is provided with a data transmission/reception circuit 111 for data communication performed through the positive terminal 21. The charger-side microcomputer 76 performs the data communication through the circuit 111 and the terminal 21.

Although the illustration of the configuration and operation of the circuit 101 of the battery pack 10 and the circuit 111 of the battery charger 20 is omitted, the outline of the configuration and the operation will be described below.

The battery 31 in the battery pack 10 includes an inductance component (parasitic inductance) therein. Although the internal inductance components are different in size, not only lithium ion batteries but also various types of other batteries have the internal inductance component. In the second embodiment, the data communication is performed by utilizing changes in the battery voltage Vbat attributed to the internal inductance component of the battery 31.

That is, the data transmission/reception circuit 101 of the battery pack 10 includes a switch (for example, a semiconductor switching element such as a bipolar transistor) for conducting and interrupting between the positive electrode and the negative electrode (between the positive terminal 11 and the negative terminal 12) of the battery 31, and the switch is turned on or off according to the data outputted from the battery-side microcomputer 32.

When the switch is turned on in the circuit 101, the positive electrode and the negative electrode of the battery 31 are electrically conducted to each other, whereby current starts to flow from the battery 31. At this time, the battery voltage Vbat is instantaneously lowered attributed to the internal inductance component of the battery 31. In the circuit 101, the switch is turned on or off according to the data, from the battery-side microcomputer 32 to thereby change the battery voltage Vbat (in other words, the battery voltage Vbat is modulated with the data), and, consequently, the data is transmitted to the battery charger 20.

Meanwhile, the circuit 111 of the battery charger 20 receives the data transmitted from the battery pack 10 as follows. That is, the voltage of the terminal 21 (more specifically, a voltage between the terminals 21 and 22) is captured, and the data component contained in the voltage is extracted by using a filter and various circuits such as a waveform shaping circuit. The extracted data is then outputted to the charger-side microcomputer 76.

The operation of the circuits 101 and 111 in the data transmission from the battery pack 10 to the battery charger 20 has been described. In the data transmission from the battery charger 20 to the battery pack 10, a similar operation is performed. That is, the circuit 111 of the battery charger 20 is provided with a switch for conducting or interrupting between the terminals 21 and 22, and the switch is turned on or off according to the data outputted from the charger-side microcomputer 76. According to this configuration, since the voltage of the terminal 21 (furthermore, the battery voltage Vbat) is changed according to the data, the data transmission can be realized by the voltage change.

Meanwhile, the circuit 101 of the battery pack 10, similar to the circuit 111 of the battery charger 20, is configured such that the voltage of the terminal 11 is captured, and the data component contained in the voltage can be extracted by using a filter and various circuits such as a wave-shaping circuit. The extracted data is outputted to the battery-side microcomputer 32.

That is, the circuits 101 and 111 are configured to change the battery voltage Vbat according to the transmitted data in data transmission. Further, these circuits are configured to extract (demodulate) the received data based on the change of the battery voltage Vbat in data reception.

In the charging system of the present embodiment, both of the battery pack 10 and the battery charger 20 are configured such that, although they do not have an exclusive terminal for the data communication between the microcomputers 32 and 76, they can perform the data communication by using the charging power supply/input terminals. Therefore, any exclusive terminal for data communication is not required to be provided separately from the charging power supply/input terminals, whereby simplification of the configuration of the battery pack and the battery charger and size reduction thereof can be realized.

[Variation]

Although the embodiments of the present invention have been described, the present invention is not limited thereto, and various embodiments may be applied within the technical scope of the present invention.

For example, in the above embodiments, the timers 65 and 95 provided to the microcomputers 32 and 76, respectively, are configured as follows. Specifically, the 16 second timer is set in the charger-side microcomputer 76, and each process is appropriately executed with reference to the 16 second timer. However, using the timer 95 as the 16 second timer is a mere example. Similarly, also in the battery-side microcomputer 32, using the timer 65 as the 8 second timer is a mere example.

Further, the waiting time (in the present embodiments, 1 second) of the microcomputers 32 and 76 after the mounting of the battery pack 10 to the battery charger 20 (after recognition of the mounting) is a mere example, and the waiting time can be appropriately determined in a different manner.

Further, in the above embodiments, the battery 31 is configured by serially connected four battery cells. However, this is a mere example, and the number of the battery cells to constitute the battery 31 is not particularly limited. The battery 31 may be configured of one battery cell or a plurality of battery cells connected in series or in parallel. Further, the voltage value of one battery cell and the battery voltage are not limited to those exemplified in the above embodiments.

In the above embodiments, it is configured such that, the mutual communication before the start of charging is started by outputting the communication request code from the battery pack 10 to the battery charger 20. On the contrary, the mutual communication may be started by outputting the data from the battery charger 20 to the battery pack 10.

For the specific contents of the data transmitted or received in the mutual communication, the various data shown in the above embodiments are mere examples, and the specific content of the data can be appropriately determined in a different manner.

In the above embodiments, the lithium ion batteries are used as an example of the battery cells constituting the battery 31. However, this is a mere example, and even when the battery cells are rechargeable batteries other than the lithium ion batteries, the present invention can be applied in a similar manner.

What is claimed is:

1. A charging system for electric power tool, comprising a battery pack and a battery charger,
    wherein the battery pack is used for driving an electric power tool and the battery pack has a rechargeable battery (B1, B2, . . . Bn) serving as a power source for driving the electric power tool, and a battery-side microcomputer which is a microcomputer monitoring a state of the rechargeable battery (B1, B2, . . . Bn);
    wherein the battery charger is detachably mounted with the battery pack and the battery charger has a charging unit, which supplies a charging power to the battery pack and charges the rechargeable battery (B1, B2, . . . Bn), and a charger-side microcomputer which is a microcomputer controlling an operation of the charging unit,
    wherein at least while the rechargeable battery (B1, B2, . . . Bn) is charged by the charging unit, the battery-side microcomputer and the charger-side microcomputer mutually perform data communication and execute mutual operation confirmation for confirming an operational state of a microcomputer of a communication counterpart based on a result of the data communication, and
    when one of the battery-side microcomputer and the charger-side microcomputer detects an abnormality of the operational state of the microcomputer of the communication counterpart as a result of the mutual operation confirmation, a microcomputer which has detected the abnormality executes a predetermined charge stop processing for stopping charging of the rechargeable battery (B1, B2, . . . Bn).

2. The charging system according to claim 1,
    wherein, while the rechargeable battery (B1, B2, . . . Bn) is charged by the charging unit, the battery-side microcomputer and the charger-side microcomputer respectively execute the mutual operation confirmation at every specified predetermined time.

3. The charging system according to claim 1,
    wherein the battery-side microcomputer and the charger-side microcomputer respectively transmit transmission data of a predetermined type for each of the microcomputers to the microcomputer of the communication counterpart and confirm whether or not response data corresponding to the transmission data is transmitted from the microcomputer of the communication counterpart, whereby the battery-side microcomputer and the charger-side microcomputer execute the mutual operation confirmation.

4. The charging system according to claim 3,
    wherein, when the response data is not received within a predetermined time in the mutual operation confirmation during charging of the rechargeable battery (B1, B2, . . . Bn) by the charging unit, the battery-side microcomputer and the charger-side microcomputer respectively determine that the microcomputer of the communication counterpart is abnormal.

5. The charging system according to claim 3,
    wherein one microcomputer of the battery-side microcomputer and the charger-side microcomputer transmits predetermined first transmission data to the other microcomputer, whereby the mutual operation confirmation is started; the one microcomputer confirms an operational state of the other microcomputer based on whether or not first response data, corresponding to the first transmission data, is transmitted from the other microcomputer after transmission of the first transmission data; and the other microcomputer transmits the first response data in response to the first transmission data from the one microcomputer and then confirms an operational state of the one microcomputer based on whether or not second response data, corresponding to the first response data, is transmitted from the one microcomputer.

6. The charging system according to claim 5,
    wherein the one microcomputer is the battery-side microcomputer, and the other microcomputer is the charger-side microcomputer.

7. The charging system according to claim 6,
    wherein the battery-side microcomputer transmits, as the first transmission data, to the charger-side microcomputer, data that indicates a request for data communication,
    the charger-side microcomputer transmits, as the first response data, to the battery-side microcomputer, data that indicates a request for information required to control charging of the rechargeable battery (B1, B2, . . . Bn) performed by the charging unit, and
    the battery-side microcomputer transmits, as the second response data, data that indicates the information requested by the first response data.

8. The charging system according to claim 6,
    wherein, while the rechargeable battery (B1, B2, . . . Bn) is charged by the charging unit, the charger-side microcomputer transmits charge control information associated with a control state of the charging unit to the battery-side microcomputer at every predetermined timing, while the rechargeable battery (B1, B2, . . . Bn) is charged, the battery-side microcomputer stores the charge control information in a storage section for each reception of the charge control information from the charger-side microcomputer; when after the transmission of the first transmission data, the battery-side microcomputer does not receive the first response data from the charger-side microcomputer within a predetermined time, the battery-side microcomputer transmits to the charger-side microcomputer a reset confirmation code that is data for confirming whether or not the charger-side microcomputer is reset; and when the battery-side microcomputer receives predetermined third response data from the charger-side microcomputer in response to the reset confirmation code, the battery-side microcomputer transmits to the charger-side microcomputer a latest charge control information stored in the storage section, and when the charger-side microcomputer receives the reset confirmation code from the battery-side microcomputer after starting an operation of the charger-side microcomputer, the charger-side microcomputer transmits the third response data and starts a control of the charging unit based on the charge control information transmitted from the battery-side microcomputer after transmission of the third response data.

9. The charging system according to claim 1,
wherein, while the charger-side microcomputer executes the mutual operation confirmation in charging of the rechargeable battery (B1, B2, . . . Bn) performed by the charging unit, the charger-side microcomputer suspends the charging of the rechargeable battery (B1, B2, . . . Bn).

10. The charging system according to claim 1,
wherein the battery-side microcomputer and the charger-side microcomputer execute the mutual operation confirmation before start of charging of the rechargeable battery (B1, B2, . . . Bn) performed by the charging unit, and when it is confirmed that the battery-side microcomputer and the charger-side microcomputer are normal as a result of the mutual operation confirmation, the charger-side microcomputer controls the charging unit to charge the rechargeable battery (B1, B2, . . . Bn).

11. The charging system according to claim 1,
wherein the battery pack comprises:
a power receiving terminal to receive the charging power supplied from the battery charger; and
a battery-side data transmission/reception circuit provided between the battery-side microcomputer and the power receiving terminal for the purpose that the battery-side microcomputer performs data communication with the charger-side microcomputer through the power receiving terminal, and wherein the battery charger comprises:
a power supply terminal to supply the charging power to the battery pack; and
a charger-side data transmission/reception circuit provided between the charger-side microcomputer and the power supply terminal for the purpose that the charger-side microcomputer performs data communication with the battery-side microcomputer through the power supply terminal.

12. A battery pack for electric power tool, which is used for driving electric power tool and the battery pack comprises a rechargeable battery (B1, B2, . . . Bn) serving as a power source for driving the electric power tool, and a battery-side microcomputer which is a microcomputer monitoring a state of the rechargeable battery (B1, B2, . . . Bn),
wherein the battery pack is configured so as to be detachably mounted to a battery charger which includes a charging unit, which supplies a charging power to the battery pack to charge the rechargeable battery (B1, B2, . . . Bn), and a charger-side microcomputer which is a microcomputer controlling an operation of the charging unit, and
the battery-side microcomputer is configured to, at least while the rechargeable battery (B1, B2, . . . Bn) is charged by the charging unit, perform a data communication with the charger-side microcomputer and confirm an operational state of the charger-side microcomputer based on a result of the data communication, and the battery-side microcomputer is configured to, when an abnormality of the operational state of the charger-side microcomputer is detected, execute a predetermined charge stop processing for stopping charging of the rechargeable battery (B1, B2, . . . Bn).

13. A battery charger for electric power tool detachably mounted with a battery pack which is used for driving electric power tool and the battery pack comprises a rechargeable battery (B1, B2, . . . Bn) serving as a power source for driving the electric power tool, and a battery-side microcomputer which is a microcomputer monitoring a state of the rechargeable battery (B1, B2, . . . Bn), the battery charger comprising a charging unit which supplies a charging power to the battery pack to charge the rechargeable battery (B1, B2, . . . Bn), and a charger-side microcomputer which is a microcomputer controlling an operation of the charging unit,
wherein, the charger-side microcomputer is configured to, at least while the rechargeable battery (B1, B2, . . . Bn) is charged by the charging unit, perform data communication with the battery-side microcomputer and confirm an operational state of the battery-side microcomputer based on a result of the data communication, and the charger-side microcomputer is configured to, when an abnormality of the operational state of the battery-side microcomputer is detected, execute a predetermined charge stop processing for stopping charging of the rechargeable battery (B1, B2, . . . Bn).

* * * * *